United States Patent [19]

Shiiba

[11] Patent Number: 4,776,085
[45] Date of Patent: Oct. 11, 1988

[54] APPARATUS FOR USE IN AUTOMOBILE ASSEMBLING

[75] Inventor: Yoshio Shiiba, Tsurugashima, Japan

[73] Assignee: Honda Giken Kogyo Kabushiki Kaisha, Tokyo, Japan

[21] Appl. No.: 927,300

[22] Filed: Nov. 5, 1986

[30] Foreign Application Priority Data

| Nov. 8, 1985 | [JP] | Japan | 60-250011 |
| Jan. 21, 1986 | [JP] | Japan | 61-10661 |
| Jan. 21, 1986 | [JP] | Japan | 61-10663 |
| Mar. 7, 1986 | [JP] | Japan | 61-49816 |
| Mar. 7, 1986 | [JP] | Japan | 61-49821 |
| Mar. 7, 1986 | [JP] | Japan | 61-49822 |
| Mar. 27, 1986 | [JP] | Japan | 61-69487 |
| May 8, 1986 | [JP] | Japan | 61-105727 |

[51] Int. Cl.$^4$ ............................................. B23P 21/00
[52] U.S. Cl. ........................................ 29/824; 29/430
[58] Field of Search ............... 29/429, 430, 822, 823, 29/824; 198/375, 376; 414/282; 180/168

[56] References Cited

U.S. PATENT DOCUMENTS

| 3,667,564 | 6/1972 | Schnell | 180/168 X |
| 3,968,559 | 7/1976 | Karlsson | 29/430 |
| 4,040,527 | 8/1977 | Krieg | 414/282 |
| 4,541,049 | 9/1985 | Ahlbom | 180/168 X |
| 4,589,184 | 5/1986 | Asano et al. | 29/824 X |
| 4,589,199 | 5/1986 | Ohtaki | 29/824 X |
| 4,594,764 | 6/1986 | Yamamoto | 29/824 X |
| 4,646,915 | 3/1987 | Ohtaki et al. | 29/430 X |

FOREIGN PATENT DOCUMENTS

| 0143217 | 6/1985 | European Pat. Off. . |
| 2519249 | 11/1976 | Fed. Rep. of Germany ........ 29/824 |
| 5352586 | 10/1951 | Japan . |
| 56172487 | 5/1955 | Japan . |
| 57111709 | 1/1956 | Japan . |
| 587714 | 7/1956 | Japan . |
| 83328 | 5/1982 | Japan ................... 29/823 |
| 58-184235 | 12/1983 | Japan . |
| 2160827 | 1/1986 | United Kingdom . |

Primary Examiner—P. W. Echols
Assistant Examiner—Andrew E. Rawlins
Attorney, Agent, or Firm—Armstrong, Nikaido, Marmelstein & Kubovcik

[57] ABSTRACT

In a transfer method for use in automobile assembling a vehicle body is transferred with the variation of its direction or orientation depending on the assembling characteristics in a plurality of assembling positions in which various parts are assembled to the vehicle body. An apparatus for carrying out the transfer method comprises a travel carriage which is travelable with a vehicle body placed thereon and angularly displacable about a vertical axis.

19 Claims, 24 Drawing Sheets

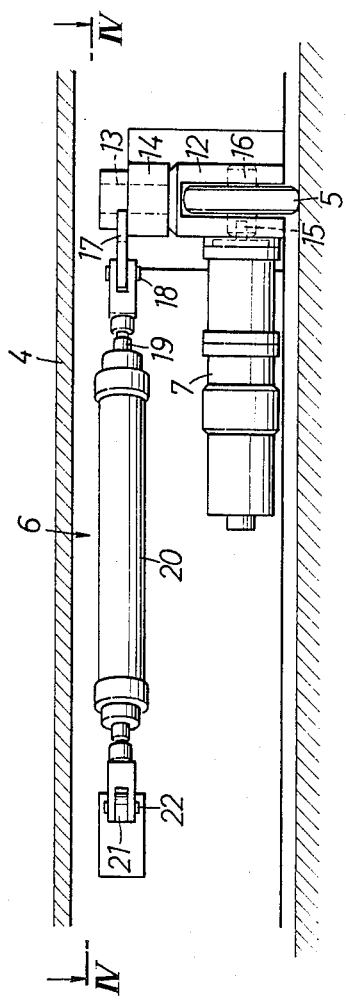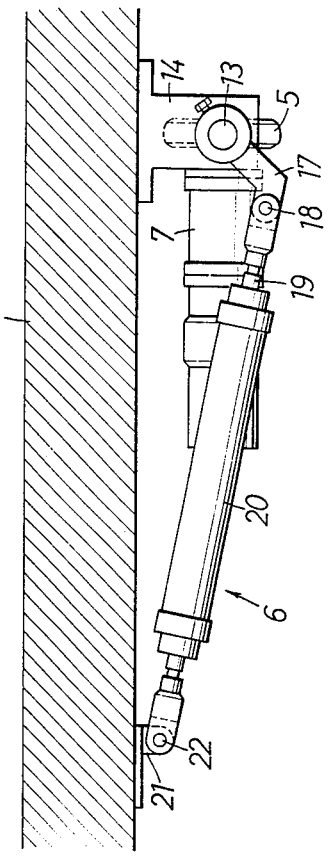

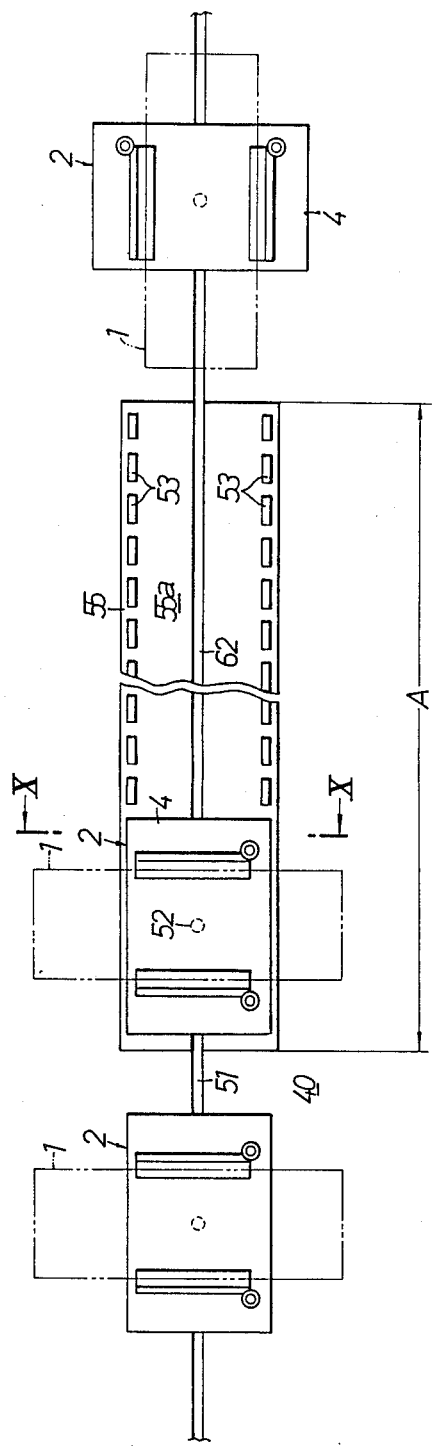
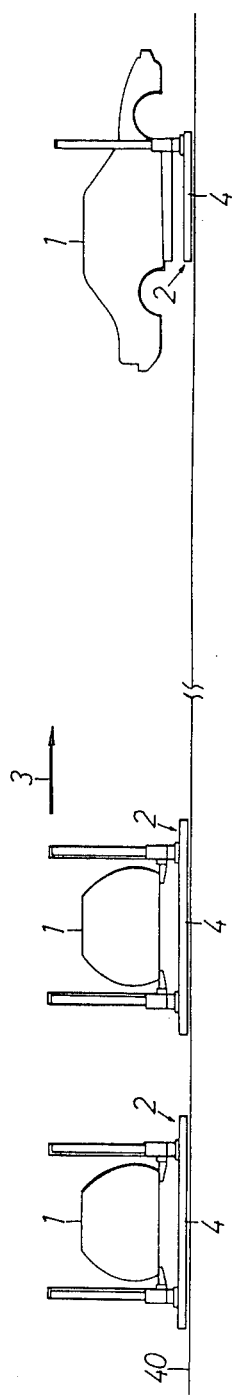

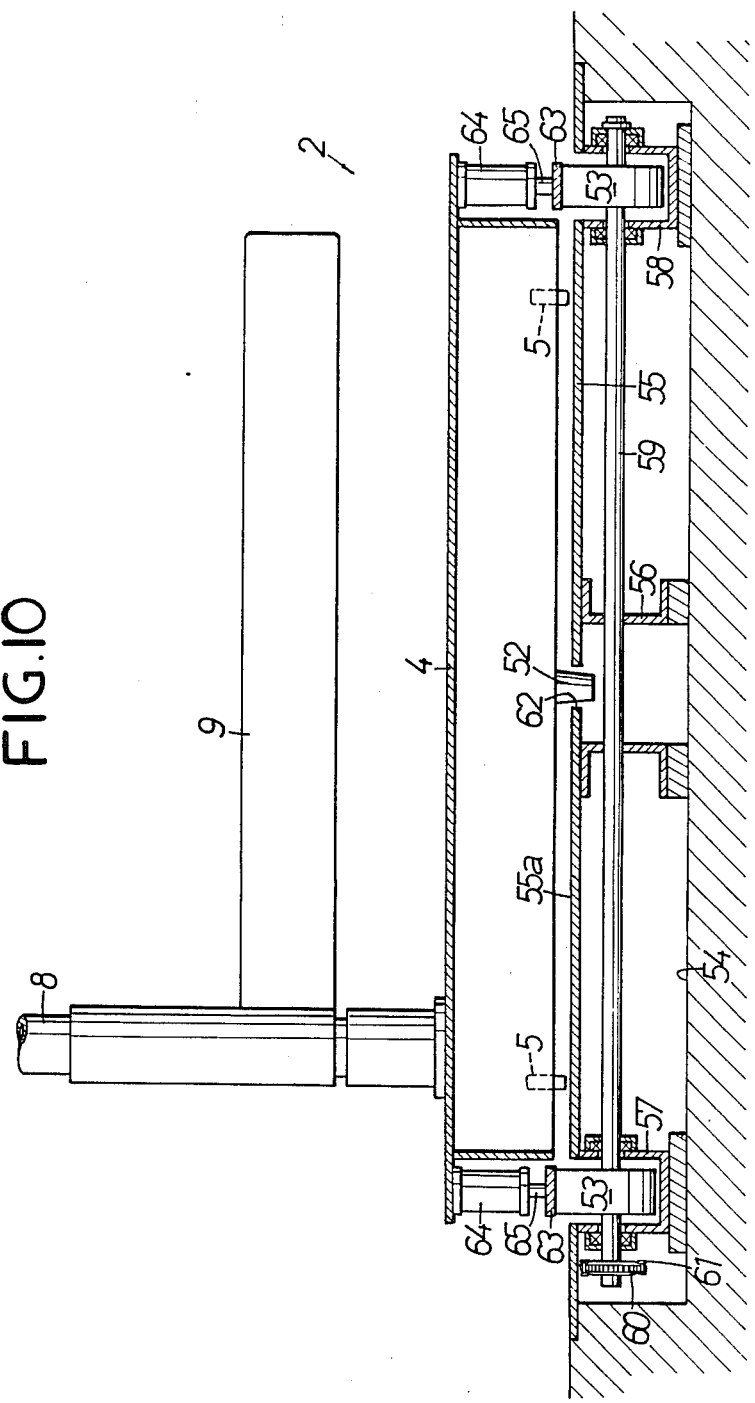

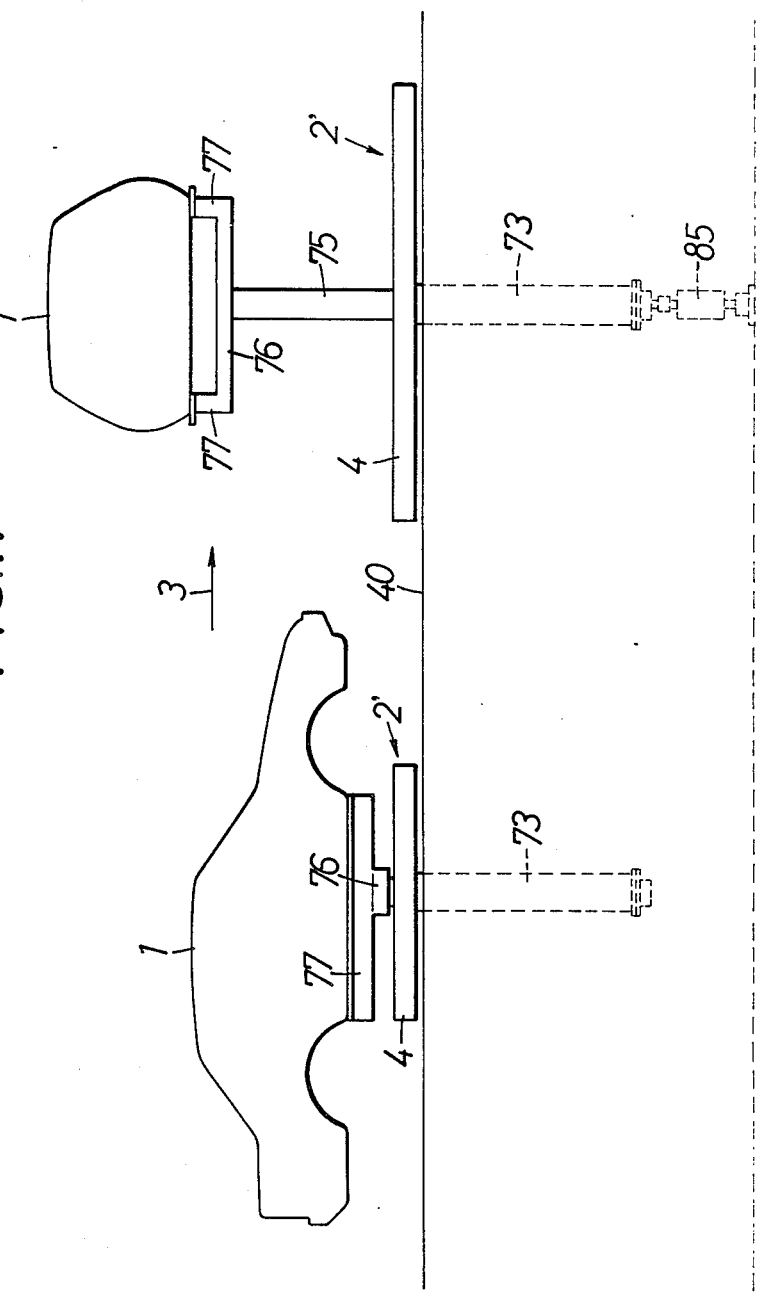
FIG. II

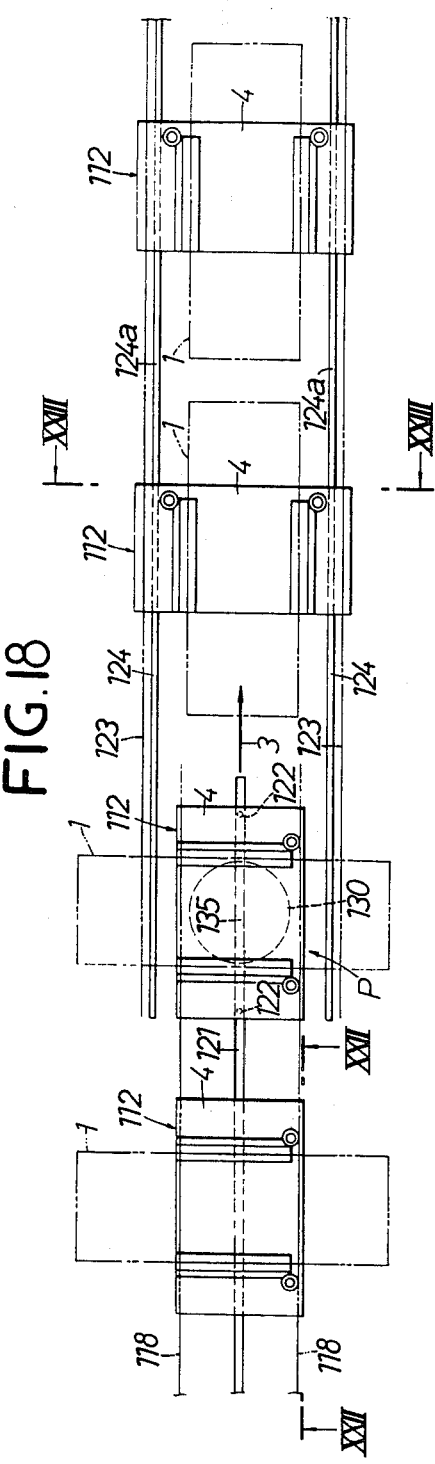
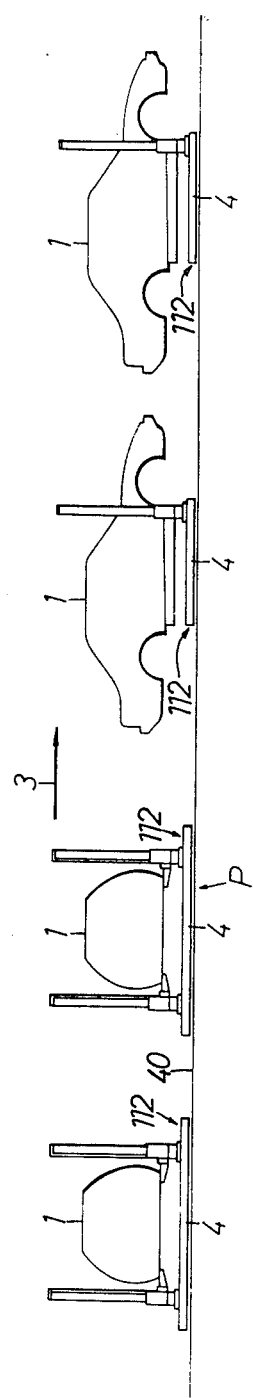
FIG.18
FIG.19

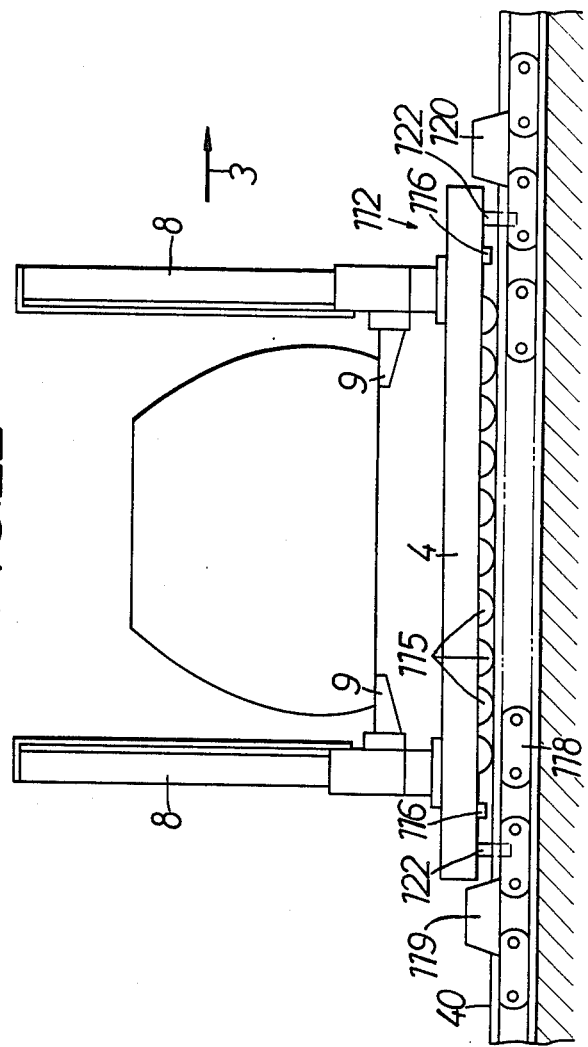

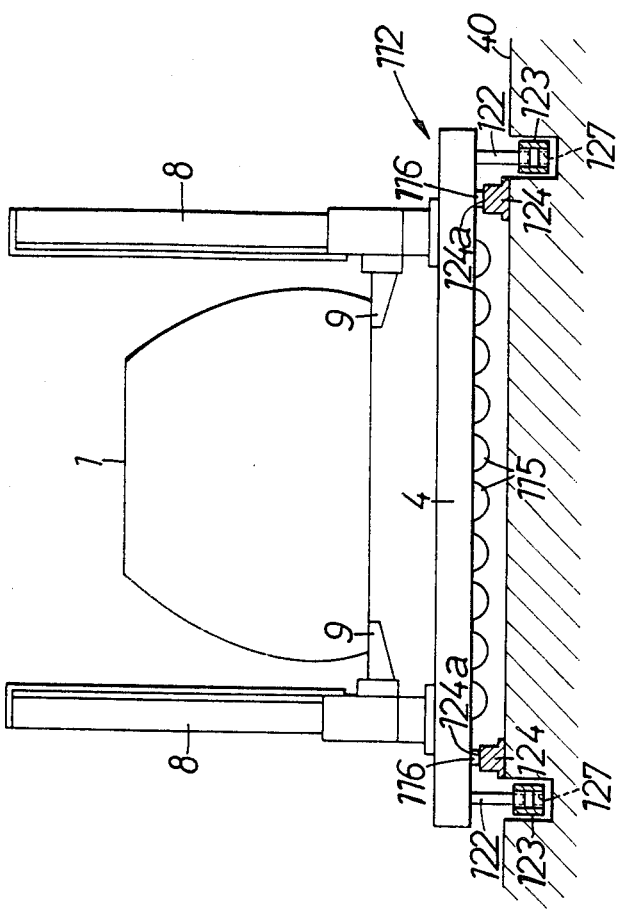

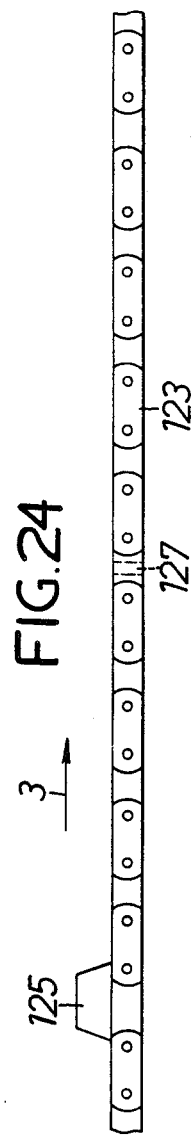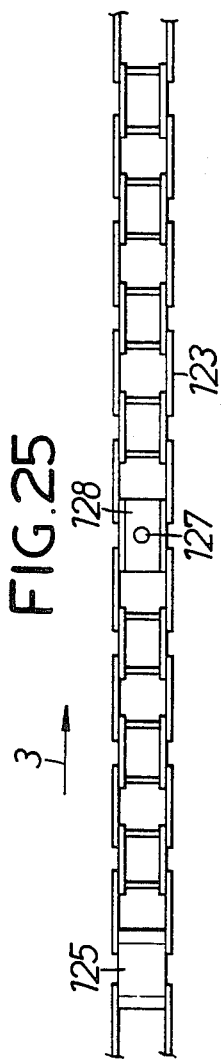

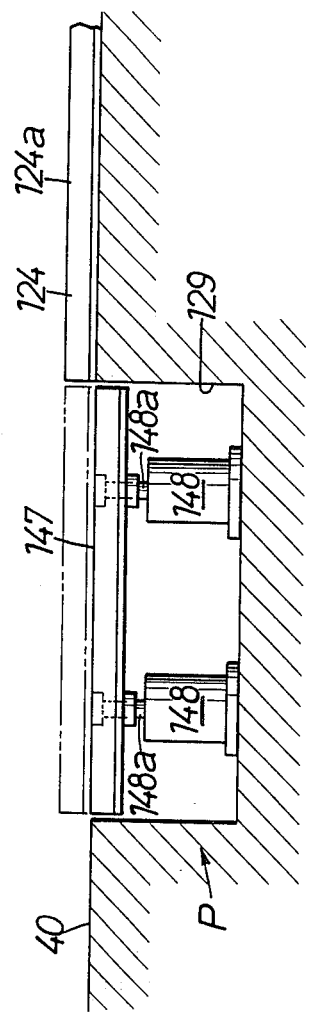

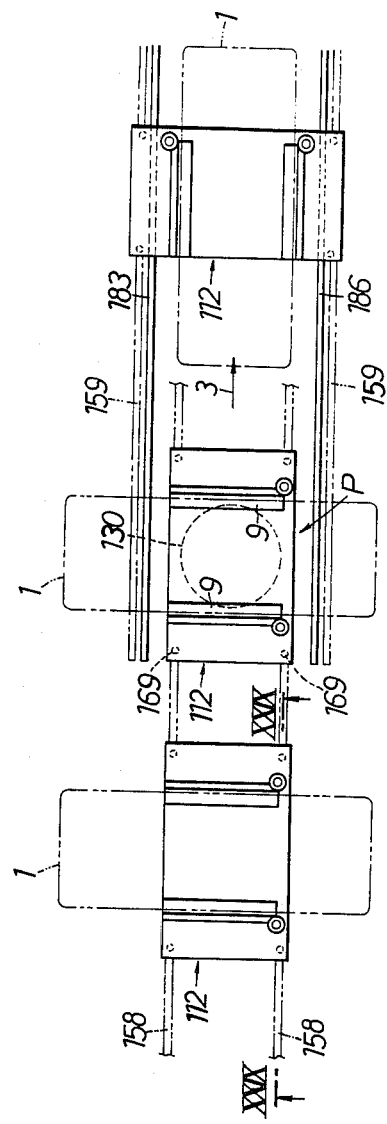
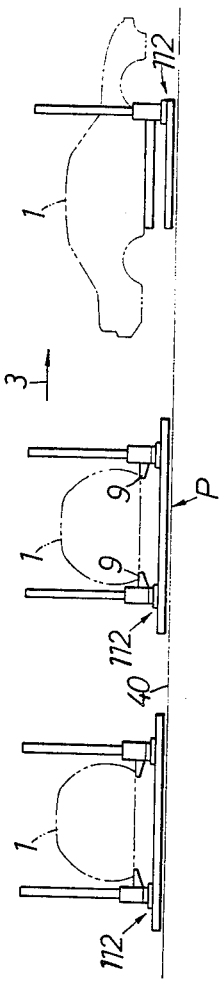
FIG.27
FIG.28

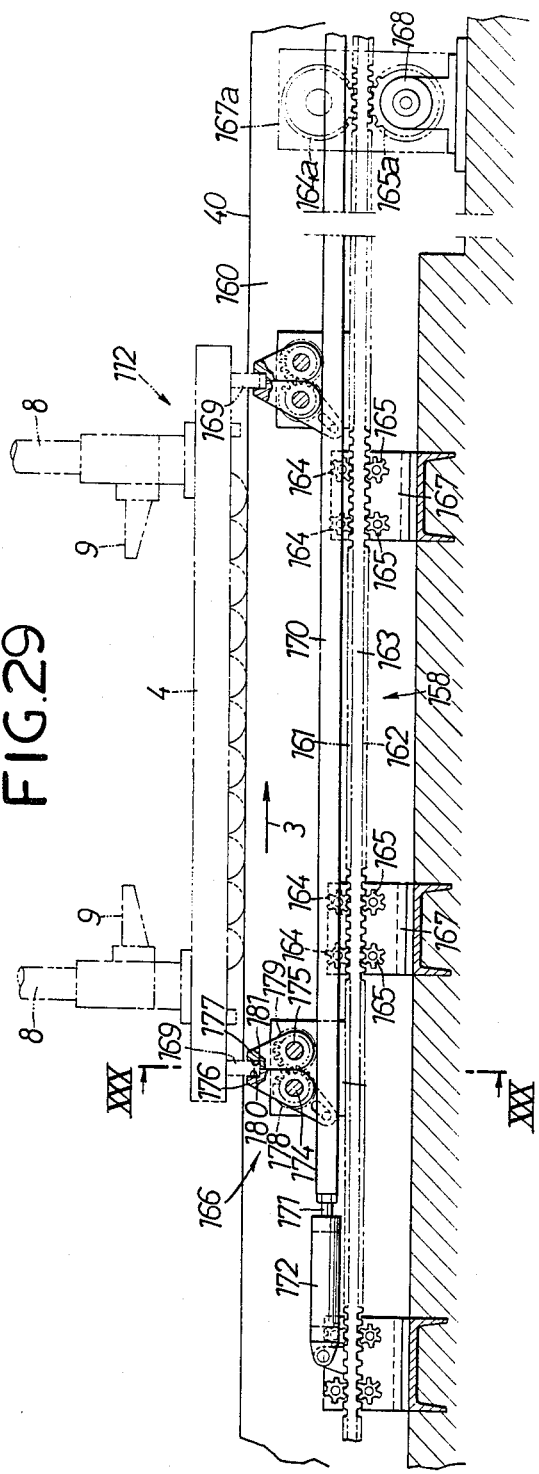
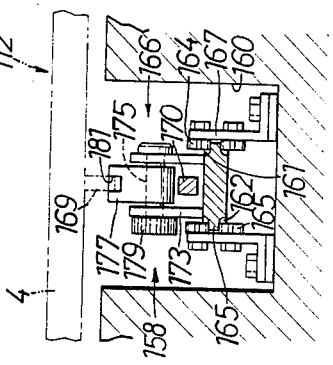
FIG.29
FIG.30

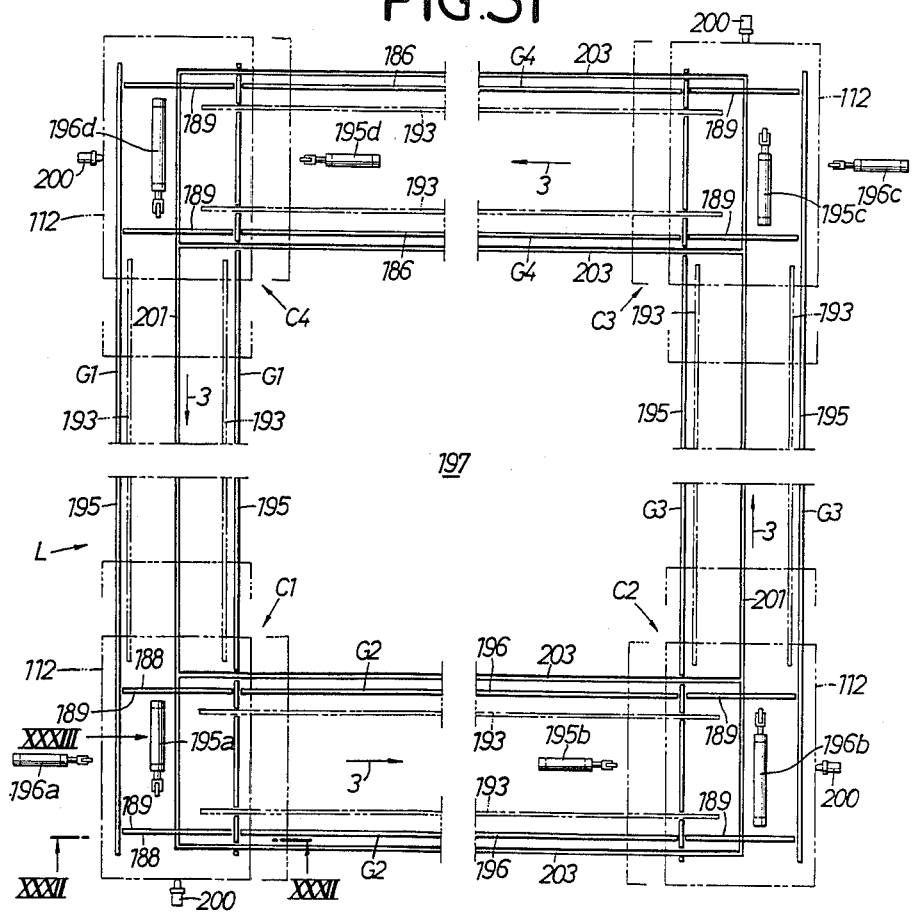

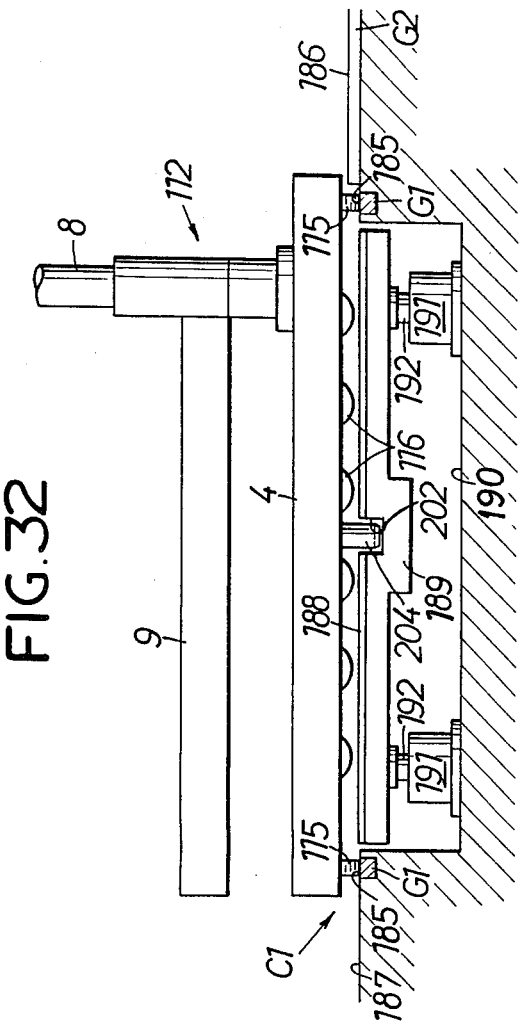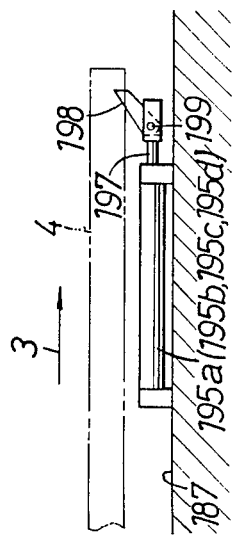

4,776,085

APPARATUS FOR USE IN AUTOMOBILE ASSEMBLING

BACKGROUND OF THE INVENTION

1. Field of the Invention

The present invention relates to a transfer method and apparatus used in automobile assembling for transferring a vehicle body to assemble an automobile.

2. Description of the Prior Art

It is a conventional and common practice to transfer a vehicle body, with the longitudinal direction thereof aligned with a transfer direction, on an over head conveyer or a slat conveyer in an automobile assembling process.

In the automobile assembling process, however, the assembling is a heavy labor because of a number of parts to be assembled to a vehicle body and of a line operation, resulting in a marked tendency to provide an automation. However, if the direction or orientation of the vehicle body is invariable as in the prior art, the movement of an automatic assembling device is complicated in assembling parts, for example, into an engine room or trunk room; too, a lot of time is required; and the cost of equipment is increased, too.

SUMMARY OF THE INVENTION

The present invention has been made with the above circumstances in view, and it is therefore an object of the present invention to provide a transfer method and apparatus for use in automobile assembling, wherein the automation of an automobile assembling process is facilitated.

To accomplish the above object, according to the present invention, a vehicle body is transferred with the variation of its direction or orientation depending on the assembling characteristics in a plurality of assembling positions in which various parts are assembled to the vehicle body. Therefore, the assembling in each of the assembling positions is facilitated, and the automation thereof is also facilitated.

In addition, in an apparatus according to the present invention, a travel carriage travelable with a vehicle body placed thereon in angularly displaceable about a vertical axis, so that the direction or orientation of the vehicle body can be easily changed by the angular displacement of the travel carriage.

It is another object of the present invention to provide a transfer apparatus for use in automobile assembling, wherein the direction and level of a vehicle body can be freely varied.

It is a further object of the present invention to provide a transfer apparatus for use in automobile assembling, wherein any portion which may be an obstacle to the assembling on front and rear sides and left and right sides of a vehicle body is eliminated to facilitate the assembling.

It is a still further object of the present invention to provide a transfer apparatus for use in automobile assembling, wherein an assembling line can be efficiently constructed in such a manner that the transfer speed in a given section is differentiated from that in other sections.

Further, it is another object of the present invention to provide a transfer apparatus for use in automobile assembling, wherein travel carriages are prevented from coming into collision with each other to damage a vehicle body.

The above and other objects, features and advantages of the invention will become apparent from reading of the following description of the preferred embodiments taken in conjunction with the accompanying drawings.

BRIEF DESCRIPTION OF THE DRAWINGS

FIGS. 1 to 7 illustrate a first embodiment of the present invention, wherein

FIG. 1 is a side view illustrating a transfer apparatus as transferring a vehicle body;

FIG. 2 is a partially cut-away cross sectional view of a travel carriage;

FIG. 3 is an enlarged sectional view taken in the direction of the arrow III of FIG. 2;

FIG. 4 is a sectional view taken along the line IV—IV of FIG. 3;

FIG. 5 is an enlarged sectional view taken along the line V—V of FIG. 2;

FIG. 6 is an enlarged sectional view taken along the line VI—VI of FIG. 5; and

FIG. 7 is an enlarged sectional view taken along the line VII—VII of FIG. 2;

FIGS. 8, 9 and 10 illustrate a second embodiment of the present invention, wherein FIG. 8 is a plan view of the second embodiment;

FIG. 9 is a side view of the embodiment of FIG. 8; and

FIG. 10 is an enlarged sectional view taken along the line X—X of FIG. 8;

FIGS. 11 to 17 illustrate a third embodiment of the present invention, wherein

FIG. 11 is a side view of the third embodiment;

FIG. 12 is an enlarged sectional view of a travel carriage;

FIG. 13 is a sectional view taken along the line XIII—XIII of FIG. 12;

FIG. 14 is an enlarged sectional view taken along the line XIV—XIV of FIG. 13;

FIG. 15 is a sectional view taken along the line XV—XV of FIG. 14;

FIG. 16 is a sectional view taken along the line XVI—XVI of FIG. 14;

FIG. 17 is an enlarged sectional view taken along the line XVII—XVII of FIG. 14;

FIGS. 18 to 25 illustrate a fourth embodiment of the present invention, wherein

FIG. 18 is a plan view of the fourth embodiment;

FIG. 19 is a side view of the embodiment of FIG. 18;

FIG. 20 is an enlarged plan view of a travel carriage;

FIG. 21 is a vertical sectional side view of a shifting position;

FIG. 22 is an enlarged sectional view taken along the line XXII—XXII of FIG. 18;

FIG. 23 is an enlarged sectional view taken along the line XXIII—XXIII of FIG. 18;

FIG. 24 is an enlarged side view of a second drive chain;

FIG. 25 is a plan view of the embodiment of FIG. 24;

FIG. 26 is a vertical sectional side view of a fifth embodiment of the present invention;

FIGS. 27 to 30 illustrate a sixth embodiment of the present invention, wherein

FIG. 27 is a plan view of the six embodiment;

FIG. 28 is a side view of the embodiment of FIG. 27;

FIG. 29 is an enlarged sectional view taken along the line XXIX—XXIX of FIG. 27; and FIG. 30 is a sectional view taken along the line XXX—XXX of FIG. 29; and FIGS. 31 to 33 illustrate a seventh embodiment of the present invention, wherein FIG. 31 is a plan view of the entire seventh embodiment;

FIG. 32 is an enlarged sectional view taken along the line XXXII—XXXII of FIG. 31; and FIG. 33 is an enlarged sectional view taken in the direction of the arrow XXXIII of FIG. 31.

DESCRIPTION OF THE PREFERRED EMBODIMENTS

The present invention will now be described by way of embodiments with reference to the accompanying drawings.

Figure 1:
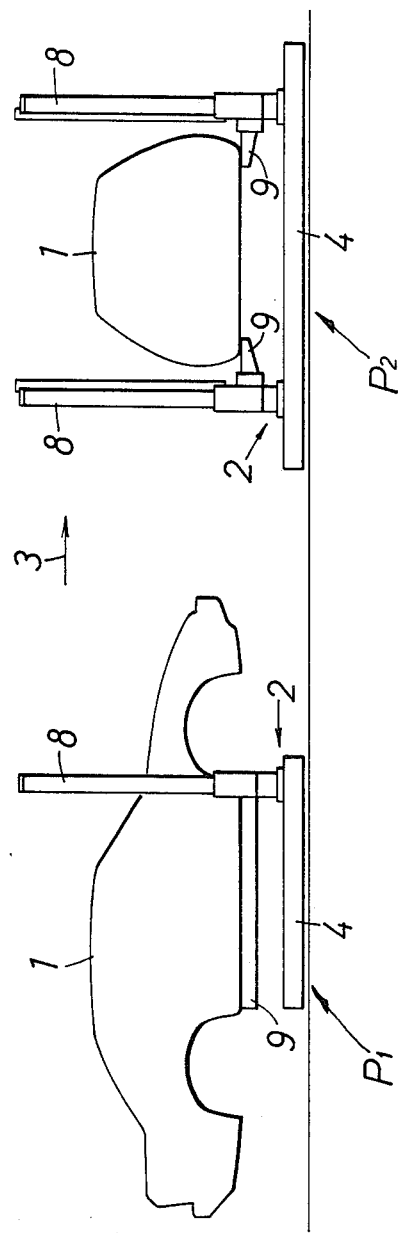

Referring first to FIG. 1 illustrating a first embodiment, a vehicle body 1 is placed onto a travel carriage 2 and transferred in a transfer direction 3 by the travel carriage 2. A plurality of assembling positions P1, P2 . . . are established along the transfer direction 3. The assembling of each part to the body 1 is conducted in each of the positions P1, P2 . . . , but the travel carriage 2 is capable of turning the direction of the body 1 depending on the working characteristics in the individual assembling positions P1, P2 . . . and further of adjusting the level of the body 1.

Figure 2:
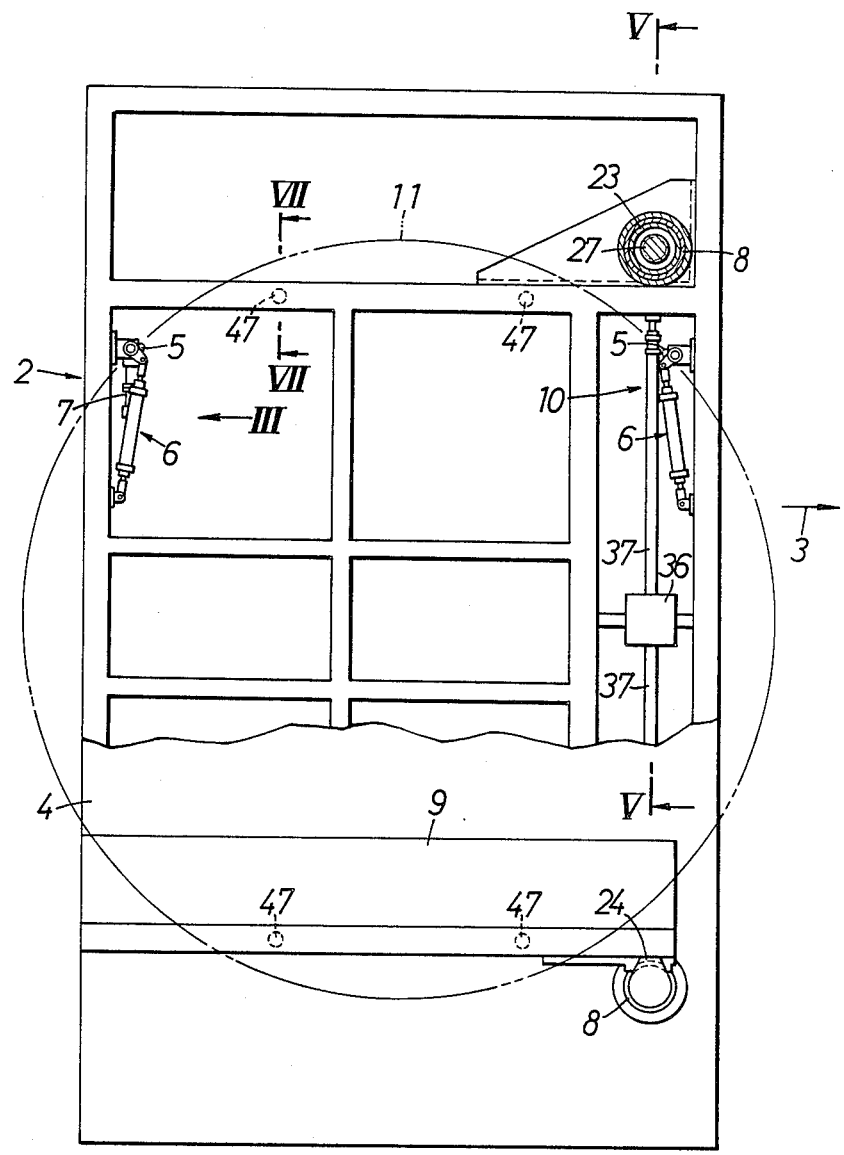

Referring also to FIG. 2, the travel carriage 2 comprises a square hollow base 4, four wheels 5 steerably mounted on the lower portion of the base 4, steering mechanisms 6 for steering the wheels 5, pneumatic motors 7 as drive sources connected to the wheels 5, a pair of cylindrical guide posts 8 mounted to rise on the base 4 at a distance larger than the width of the body 1, a pair of receiver members 9 liftable respectively along the guide posts 8 for receiving the opposite side bottom portions of the body 1, and lift mechanism 10 connected to the receiver members 9.

Each of the wheels 5 is disposed on a phantom circle 11 drawn around the center of the base 4 and at each corner of the square, so that the steering of these wheels 5 enables the travel carriage 2 and thus the body 1 on the carriage 2 to be turned to any direction.

Referring to FIGS. 3 and 4, each wheel 5 is carried on a downwardly opened substantially U-shaped support member 12 to have a horizontal axis, and a support shaft 13 integrally mounted in projection on the support member 12 is supported on a support arm 14 for rotation about a vertical axis. The support arm 14 is secured to the base 4.

The pneumatic motor 7 is supported on and fixed to the sides of the two support members 12 carried on the base 4 at its rear portion when the body 1 is turned in the transfer direction 3, and the motor 7 has an output shaft 15 coaxially connected to an axle 16 of the wheel 5.

The steering mechanism 6 is disposed for every wheel 5 and comprised of a swingable arm 17 fixedly connected at one end to the upper end of the support shaft 13, and a pneumatic cylinder 20 including a piston rod 19 connected through a pin 18 to the other end of the swingable arm 17. The pneumatic cylinder 20 is horizontally supported through a pin 22 on a bracket 21 securely mounted on the base 4.

In such steering mechanism 6, the expanding and retracting operation of the pneumatic cylinder 20 causes the support shaft 13 and thus the support members 12 to rotate about the vertical axis, thereby providing the steering of the wheel 5.

Figure 5:
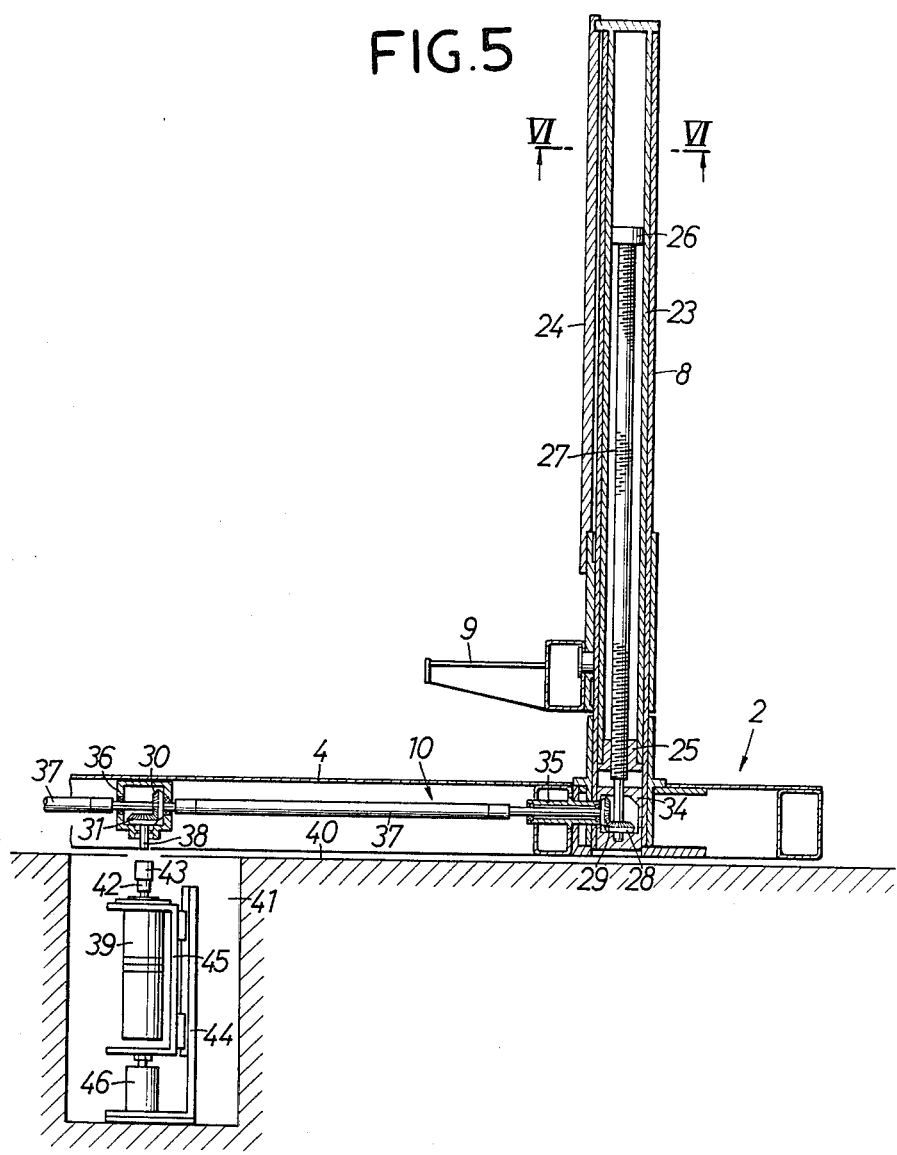

Referring to FIG. 5, the lift mechanism 10 includes a lifting tube 23 fitted within each guide post 8 and a support plate 24 depending along the outer surface of the guide post 8 from the upper end of the lifting tube 23, protruding from the top end of the guide post 8, the support plate 24 having the receiver member 9 securely mounted at the lower end thereof. The lift mechanism 10 further includes a nut 25 securely mounted in the lower end of the lifting tube 23, a screw shaft 27 having at its upper end a guide member 26 slidable within the lifting tube 23 and threadedly fitted in the nut 25, a first bevel gear 28 mounted on the lower end of the screw shaft 27, a second bevel gear 29 meshed with the first bevel gear 28, a third bevel gear 30 coaxially connected to the second bevel gears 29 of the both guide posts 8, and a fourth bevel gear 31 meshed with the third bevel gear 30.

Figure 6:
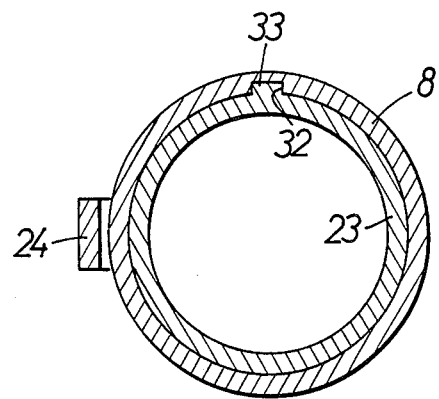

Referring to FIG. 6, a groove 32 is provided in the inner surface of the guide post 8 to axially extend over the entire length of the guide post 8, while a ridge 33 is provided on the outer surface of the lifting tube 23 and slidably fitted in the groove 32. This blocks the rotation of the lifting tube 23 about its axis, but permits the axial movement of the lifting tube 23. Consequently, the lifting tube 23 may be moved up or down in response to the rotating movement of the screw shaft 27. Moreover, the receiver member 9 is moved up or down in response to the turning movement of the screw shaft 27, because it is connected to the lifting tube 23 through the support plate 24.

The lower end of the guide post 8 is inserted in the base 4 and has a gear box 34 fitted and securely mounted therein. The first bevel gear 28 coaxially connected to the screw shaft 27 is rotatably supported within the gear box 34. Also connected to the side of the gear box 34 is a support tube 35 extending inwardly of the base 4, so that the second bevel gear 29 rotatably supported by the support tube 35 may be meshed with the first bevel gear 28 within the gear box 34.

At the middle between both the guide posts 8, a gear box 36 is stationarily disposed within the base 4, and the third bevel gear 30 coaxial with the second bevel gear 29 is rotatably supported within the gear box 36. Moreover, the third bevel gear 30 is coaxially connected with the second bevel gears 29 on the opposite sides through transmitting shafts 37.

The fourth bevel gear 31 is rotatably supported within the gear box 36 to have a vertical rotational axis, with a shaft 38 of the fourth bevel gear 31 protruding downwardly out of the gear box 36.

A lift drive shaft 39 connectable to the lift mechanism 10 is disposed at a set place on the way in the direction 3 of transfer by the travel carriage 2. More specifically, a pit 41 is provided at a set place in a travel path surface 40 on which the travel carriage 2 travels, and the lift drive source 39, which is connectable to the shaft 38 of the fourth bevel gear 31 in the lift mechanism 10, is disposed within the pit 41.

The lift drive source 39 is, for example, a pneumatic motor having a vertical output shaft 42 which has a socket connection 43 mounted at the upper end thereof and connectable to the shaft 38. The lift drive source 39 is fixed to a bracket 45 which is liftably supported on a vertically extending guide plate 44. Further, a lifting pneumatic cylinder 46 is disposed between the base portion of the guide plate 44 and the bracket 45, so that the expanding and retracting of the pneumatic cylinder 46 causes the lift drive source 39 to move up and down between a position in which the socket connection 43 is connected to the shaft 38 and a position in which the socket connection 43 is disconnected from the shaft 38.

Figure 7:
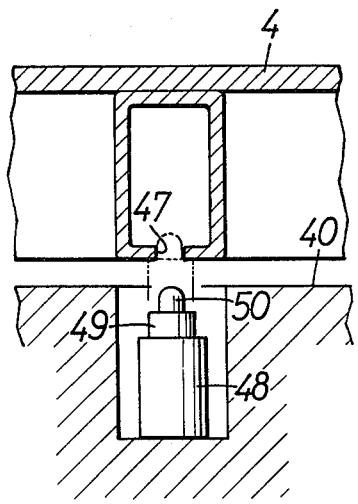

Referring to FIG. 7, a plurality of positioning holes 47 are made in the bottom of the base 4, and a positioning cylinder 48 is disposed in the travel path surface 40 so that it may be opposed to the positioning hole 47 when the base 4 is in a position in which the lift drive source may be connected to the lift mechanism 10. A positioning pin 50 is mounted on the fore end of a piston rod 49 in the positioning cylinder 48 and adapted to be fitted into the positioning hole 47, so that the travel carriage 2 may be positioned by expanding the positioning cylinder 48 to cause the positioning pin 50 to be fitted into the positioning hole 47.

Description will now be made of the operation of this first embodiment. The vehicle body 1 is placed onto both the receiver members 9 perpendicularly to the longitudinal direction of the base 4. If the body 1 is to be transferred in this state with the longitudinal axis thereof aligned with the transfer direction 3, then the pneumatic motor 7 is actuated with each wheel 5 turned in the transfer direction 3 by the steering mechanism 6. When the body has reached the assembling position P1 with the orientation or direction thereof aligned with the transfer direction 3, workings are conducted including, for example, the mounting of parts such as a gauge board, seats, floor mats, steering wheels or the like into a compartment, the boarding of a ceiling, and the mounting of doors, and further, the assembling of brake drums and tires is also conducted.

If the vehicle body 1 is to be turned to a direction perpendicular to the transfer direction 3, the pneumatic motor 7 is actuated with each wheel 5 steered by the steering mechanism 6 along the phantom circle 11. If doing so, the travel carriage 2 can be turned through any angle about its vertical center line and thus, the body 1 can be turned to the direction perpendicular to the transfer direction 3.

Thereafter, the pneumatic motor 7 is actuated with the direction of each wheel 5 aligned with the transfer direction 3, whereby the body 1 can be transferred in the state turned perpendicularly to the transfer direction 3.

When the body 1 has been transferred, for example, from the assembling position P1 and has reached the assembling position P2 in such state, workings are conducted including, for example, the mounting of parts such as an engine, a radiator tank, brakes, a battery, a dynamo, an air conditioner or the like into an engine compartment, the attaching of a front bumper and head lights to the front portion of the body 1, the assembling of a mat, preparative tools and a spare tire into a trunk, the attaching of stop lamps and a bumper to the rear portion of the body 1, and the mounting of a muffler, a shock absorber, rear axles, a steering shaft or the like.

In addition, when the travel carriage 2 has reached any one of the assembling positions P1, P2 . . . , the lift drive source 39 is moved up and connected to the shaft 38 of the lift mechanism 10 in such a state that the positioning cylinder 48 has been expanded to maintain the travel carriage 2 stationary. The actuation of the lift drive source 39 in this state enables the receiver members 9 and thus the vehicle body 1 to be moved up or down.

If the body 1 is transferred with the orientation varied depending on the working characteristics in the individual assembling positions P1, P2 . . . in the above manner, the various parts are easier to be assembled and the automated assembling thereof is facilitated. Even with the assembling not automated, the distance the operator has to walk is shortened, and the entire length of the assembling process is also shortened.

Moreover, because the body 1 is adjustable in level, the assembling is further facilitated. In addition, since the receiver member 9 receives both the left and right bottom portions of the body 1, there is no obstacle in assembling the parts to the bottom portions and the opposite side portions. This also facilitates the assembling of each part to the body 1. Also, since the lift drive source 39 is not equipped on the travel carriage 2, the weight is correspondingly reduced and the loading of the pneumatic motor 7 as a travel drive source is reduced.

FIGS. 8, 9 and 10 illustrate a second embodiment of the present invention, wherein the parts corresponding to those in the first embodiment are designated by the same reference characters used in the first embodiment.

A guide groove 51 is provided in the travel path surface 40 to extend in the transfer direction 3, and a guide pin 52 is mounted on the central underside of the base 4 of the travel carriage 2 and fitted in the guide groove 51. This enables the travel carriage 2 to linearly travel in the transfer direction 3 and moreover to turn about the guide pin 52 when desired, thus preventing the misalignment of the central position.

Arrays of a plurality of drive wheels 53 are arranged in parallel in the transfer direction 3 in a given section A on the way of the assembling line, for example, to increase the travel speed of the travel carriage 2 as compared to that in other sections.

A pit 54 is provided in the travel path surface 40 in the given section A to extend in the transfer direction 3, and the upper opened end of the pit 54 is closed with a floor plate 55 flush with the travel path surface. The floor plate 55 is supported at its widthwise central portion on the central support 56 mounted at the central bottom of the pit 54, and at its opposite sides respectively on side supports 57 and 58 mounted at the opposite sides of the bottom of the pit 54. A horizontal rotary shaft 59 extending perpendicularly to the transfer direction 3 is rotatably carried in the individual supports 56, 57 and 58. A plurality of such rotary shafts are arranged at distances spaced in the transfer direction 3. The opposite side supports 57 and 58 are each formed into an upwardly-opened and substantially U-shaped configuration, and a drive wheel 53 is secured to the rotary shaft 59 within each of these supports 57 and 58. A sprocket wheel 60 is secured to the end of the rotary shaft 59, protruded sideways from one of the side supports 57, and an endless chain 61 driven by a drive source (not shown) is passed around each sprocket 60. Thus, the individual drive wheels 53 are driven for rotation in an interlocking manner.

Each of the drive wheels 53 is disposed with its upper portion protruded upwardly from the floor plate 55, and a guide slit 62 is made at the center in the floor plate over the entire length thereof and connected to the guide groove 51 to guide the guide pin 52.

A pair of slide contact plates 63 capable of coming into slide contact with the drive wheels 53 are liftably mounted on the travel carriage 2. More specifically, the slide contact plates 63 are liftably disposed respectively below the base 4 on the opposite ends of the receiver member 9 with respect to the direction perpendicular to the longitudinal direction of the receiver member 9 to extend a long distance in the direction perpendicular to the lengthwise direction of the receiver member 9. Moreover, they are positioned so that each of them may be opposed to each drive wheel 53.

A plurality of pneumatic cylinders 64 for each of the slide contact plates 63 are fixedly disposed under the base 4 and serve as drive means for driving each slide contact plate 63. Each of the pneumatic cylinders 64 is fixed to the base 4 with its piston rod 65 downward, and the slide contact plates 63 are secured respectively to the fore or lower ends of the individual piston rods 65 in the same manner. This permits the slide contact plate 63 to move up or down in response to the expansion or retraction of the pneumatic cylinder 64, but the length of and the amount of expansion and retraction of the pneumatic cylinder 64 are determined such that the slide contact plate 63 may be moved up and down between an upper limit position in which the slide contact plate 63 is located above the travel path surface 55a formed on the upper surface of the floor plate 55 with each wheel 5 landed on the travel path surface 55a and a lower limit position in which the slide contact plate 63 is brought into slide contact with the drive wheel 53 with each wheel 5 lifted off the travel path surface 55a.

Description will now be made of the operation of the second embodiment. The body 1 is placed onto the receiver members 9 of the travel carriage 2. In this state, the body 1 is transferred with its orientation perpendicular to the transfer direction 3, and when it has reached the given section A, the pneumatic cylinder 64 is expanded to bring the contact plate 63 into slide contact with the drive wheel 53, while lifting each wheel 5 off the travel path surface 55a. As each drive wheel 53 is driven to rotate in this state, the travel carriage 2 travels under the influence of the friction between the slide contact plate 63 and the drive wheel 53. In this case, the pneumatic motor 7 included as a travel drive source in the travel carriage 2 is inoperative, and the travel carriage 2 travels in the transfer direction 3 at a higher speed than those in other sections.

After completion of travelling in the given section A, the pneumatic cylinder 64 is retracted, causing each wheel 5 to be landed onto the travel path surface 55a, while causing the slide contact plate 63 to move upwardly away from the drive wheel 53. When the pneumatic motor 7 is then actuated, each wheel travels from the travel path surface 55a onto the travel path surface 40, and the travel speed thereof is returned to the original travel speed.

When the body 1 is to be transferred with its orientation aligned with the transfer direction 3, the pneumatic motor 7 may be actuated with each wheel 5 being steered by the steering mechanism 6 to run along the phantom circle 11. If doing so, the travel carriage 2 can be turned through 90 degrees, about the guide pin 52 to travel with the orientation of the body 1 aligned with the transfer direction 3.

In this manner, the orientation of the body 1 can be changed and the level of the body 1 can be also adjusted, as in the first embodiment, and moreover, the travel speed of the travel carriage 2 can be varied on the way of the assembling line. Therefore, the parts can be more easily assembled to the body 1, and the assembling line can be efficiently constructed.

FIGS. 11 to 17 illustrate a fourth embodiment, wherein the portions corresponding to those in the previous embodiments are denoted by the same reference characters used in the previous embodiments.

Figure 12:
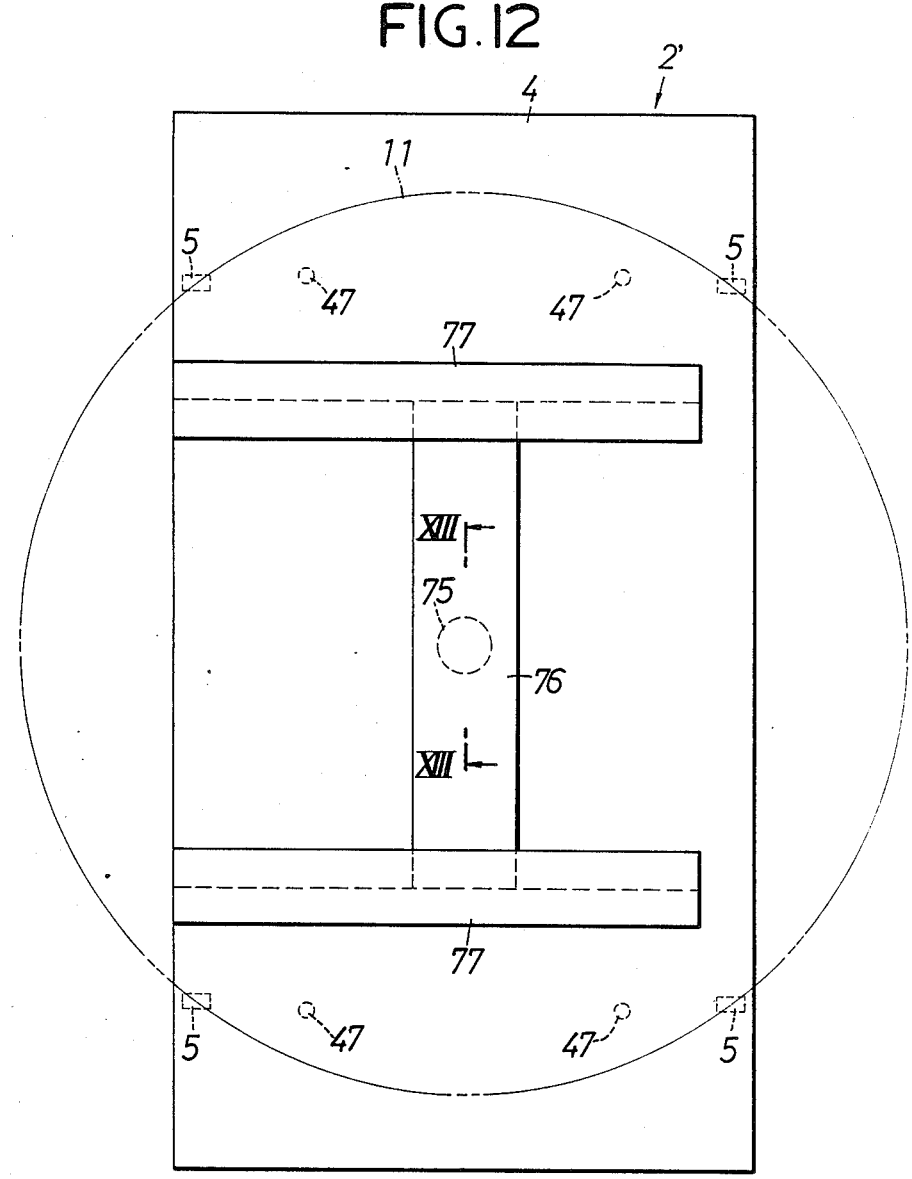

Referring first to FIGS. 11 and 12, a travel carriage 2' is provided with four thweels 5, steering mechanisms 6 and positioning holes 47, as in the previous embodiments, and is self-travelable and angularly displacable about the vertical center line.

Figure 13:
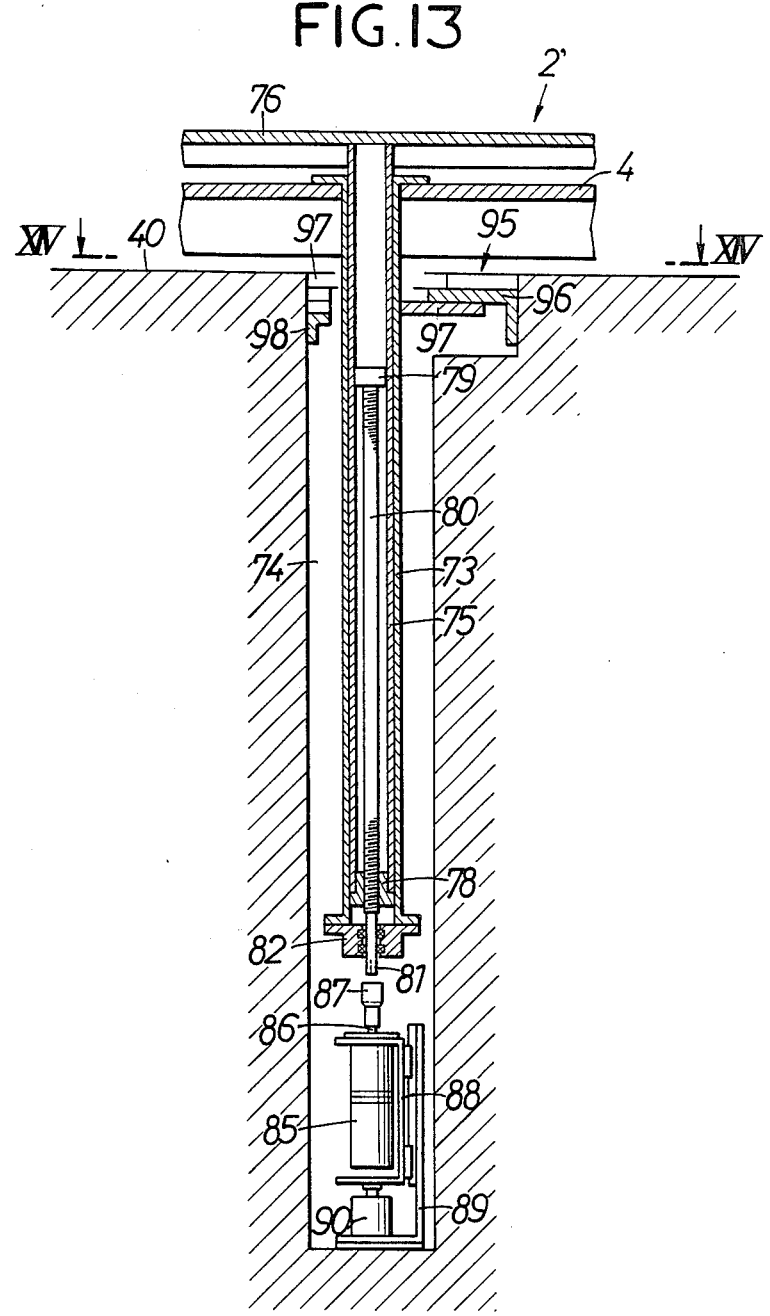

Referring to FIG. 13, a guide post 73 is fixedly mounted at the central portion of a base 4 on the travel carriage 2'. The guide post 73 is formed into a cylindrical shape and has an upper end passed through the central portion of the base 4 and secured to the base 4. Moreover, the guide post 73 is protruded downwardly from the base 4 to have a vertical axis, and a pit 74 extending in the transfer direction 3 is provided in a travel path surface on which the travel carriage 2' travels, in order to permit the movement of the guide post 73 with the travelling movement of the travel carriage 2'.

A cylindrical lifter 75 is slidably fitted in the guide post 73, and a horizontally extending arm 76 is secured at its central portion to the upper end, of the lifter 75, protruded from the upper end of the guide post 73. Receiver members 77 are fixedly mounted perpendicularly on the longitudinally opposite ends of the arm 76 for receiving the opposite left and right side bottom portions of the body 1, respectively.

A nut 78 is secured to the lower end of the lifter 75, and a screw shaft 80 is threadedly fitted in the nut 78 and has at its upper end a guide member 79 slidable within the lifter 75. A smaller diameter connecting shaft portion 81 is coaxially and integrally connected to the lower end of the screw shaft 80 and rotatably supported in a cover 82 secured to the lower end of the guide post 73.

Figure 14:
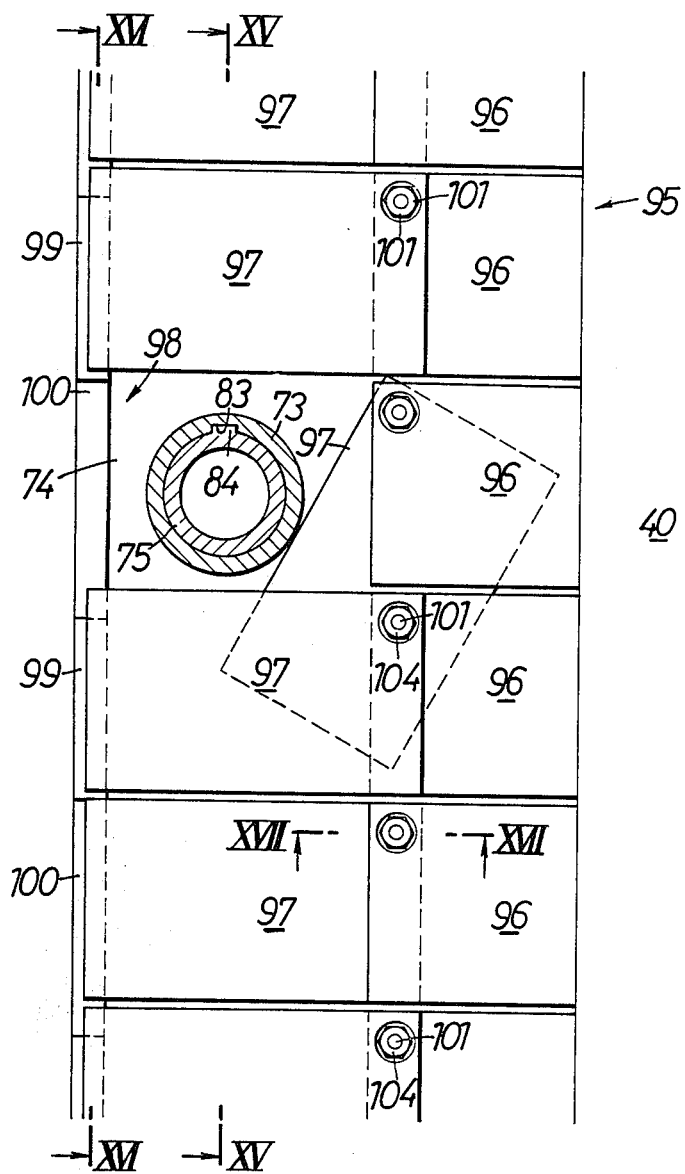

Referring to FIG. 14, an axially extending groove 83 is provided in the inner surface of the guide post 73 over the entire length thereof, and a projection 84 is integrally provided on the outer surface of the lifter 75 and slidably fitted in the groove 83. This permits the lifter 75 to be blocked against the turning movement about the axis relative to the guide post 73, but to be moved axially. Thus, the lifter 75 is moved up and down in accordance with the turning movements of the screw shaft 80. Moreover, the receiver members 77 are moved up and down in accordance with the turning movements of the screw shaft 80 because they are fixedly mounted on the upper end of the lifter 75 through the arm 76.

A lift drive source 85 connectable to the connecting shaft portion 81 of the screw shaft 80 is fixedly disposed on the bottom in a setting place on the way in the transfer direction 3. The lift drive source 85 is, for example, a pneumatic motor having a vertical output shaft 86, and a socket connection 87 is mounted on the upper end of the output shaft 86 and is fittable over and connectable to the lower end of the connecting shaft portion 81. The lift drive source 85 is fixed on a bracket 88 which vertically extends and is liftably carried on a guide plate 89 securely mounted on the bottom of the pit 74. A pneumatic lifting cylinder 90 is disposed between the base of the guide plate 89 and the bracket 88, so that the expansion and retraction of the pneumatic cylinder 90 causes the lift drive source 85 to be moved up and down between a position in which the socket connection 87 is connected to the connecting shaft portion 81 and a position in which the socket connection 87 is disconnected from the connecting shaft portion 81.

Cover means 95 is mounted on the upper opened end of the it 74 and is adapted to successively open only the portion corresponding to the travel carriage 2' with the travelling of the travel carriage 2' on the travel path surface 40.

This cover means 95 comprises a plurality of stationary support plates 96 fixedly mounted on one of the side edges at the upper opened end of the pit 74, and a plurality of moveable lid plates 97 each supported on each stationary support plate 96 for turning movement about the vertical axis and urged to close the upper portion of the pit 74. Each stationary support plate 96 and movable lid plate 97 are both formed from a rigid metal sheet.

Figure 15:
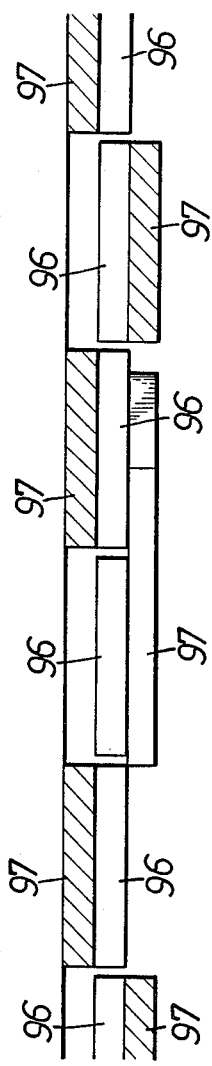

The individual stationary support plates 96 are secured to one of the side edges of the pit 74 in a flushly aligned relation to one another in the transfer direction 3. Each movable lid plate 96 is supported on each stationary support plate 76 in such a manner that it may close the upper opened end portion of the pit 74 excluding the portion covered with the stationary support plate 96, and the respective movable lid plates adjacent to each other in the transfer direction 3 are supported at different levels on the stationary support plates 96. More specifically, as shown in FIG. 15, a certain movable lid plate 97 is slidably supported on the upper surface of the stationary support plate 96, and the movable lid plate 97 adjacent to that movable lid plate 97 is slidably supported on the lower surface of the corresponding stationary support plate 96.

Figure 16:
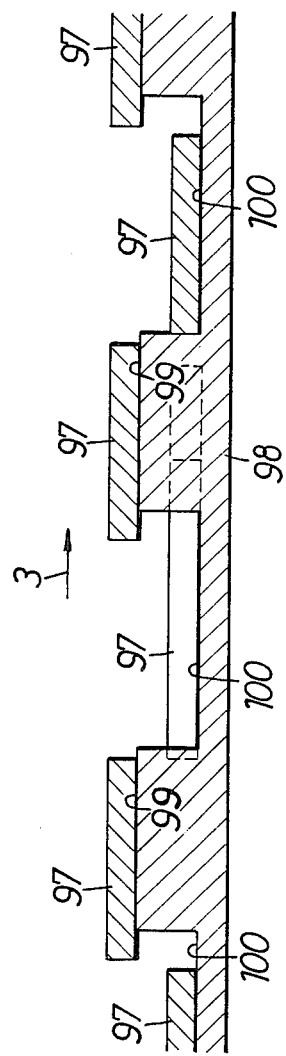

Referring to FIG. 16, a support 98 is secured to the other side edge of the pit 74 for receiving the fore end of each movable lid plate 97 and is formed, at its upper surface alternately in the transfer direction, with higher level bearing surfaces 99 on which the higher level movable lid plates 97 slidably bear and lower level bearing surfaces 100 on which the lower level movable lid plates 97 slidably bear. Moreover, the lower level bearing surface 100 is formed to have a width forwardly larger in the transfer direction than that of the corresponding movable lid plate 97 in order to permit the smooth turning movement of the lower level movable lid plate 97.

Figure 17:
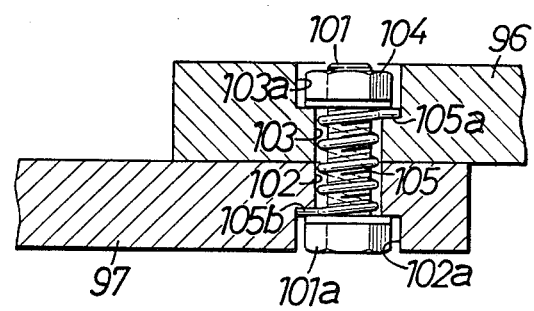

Referring to FIG. 17, the base end of each movable lid plate 97 is swingably supported on the fore end of the corresponding stationary support plate 96 at a place rearward in the transfer direction 3 by a bolt 101 having a vertical axis. More specifically, each movable lid plate 97 and stationary support plate 96 are provided with insert holes 102 and 103 larger in diameter than that of the bolt 101, respectively, so that the bolt 101 may be inserted through these insert holes 102 and 103. Further, in order to avoid the protrusion of a nut 104 threadedly fitted over the bolt 101 and the head 101a thereof from the movable lid plate 97 and the stationary support plate 96, the insert holes are provided at their ends with a larger diameter portions 102a and 103a for permitting the insertion of the head 101a and the nut 104.

A torsion spring 105 is inserted in the insert holes 102 and 103 to surround the bolt 101 inserted through the insert holes 102 and 103 and has one end 105a engaged with the stationary support plate 96 and the other end 105b engaged with the movable lid plate 97. This permits the movable lid plate 97 to be biased to close the pit 73.

The following is the description of the operation of the third embodiment. The body 1 is placed onto the receiver members 77. When the body 1 is to be transferred in this state with the longitudinal direction thereof aligned with the the transfer direction 3, the body 1 may be transferred with each wheel 5 turned to the transfer direction 3. If the orientation or direction of the body 1 is intended to be perpendicular to the transfer direction 3, then each wheel 5 may be steered along the phantom circle 11 and the travel carriage 2' may be turned about its vertical center line.

When the travel carriage 2' has reached the setting position, the lift drive source 85 is moved up in the state of the travel carriage 2' positioned, and is connected to the connecting shaft portion 81 of the screw shaft 80. Thereupon, the receiver members 77 and the body 1 can be moved up or down by actuating the lift drive source 85.

The capability to provide any change of the direction or orientation of the body 1 and also to adjust the level of the body 1 results in a facilitation of assembling the parts to the body 1. In addition, the receiver members 77 receive the opposite left and right side bottom portions of the body 1 and hence, there is no obstacle on the front and rear sides and left and right sides of the body 1 in assembling the parts to the body 1, thereby providing the facilitation of the assembling of the parts to the body 1.

Further, in the cover means 95, only the movable lid plate 97 urged against the spring force of the torsion spring 105 by guide post 73 with the travelling movement of the travel carriage 2' is swung to open, but the other movable lid plates 97 remain closed. Therefore, accidental falls of an operator into the pit 74 are reliably prevented.

FIGS. 18 to 25 illustrate a fourth embodiment of the present invention, wherein the portions corresponding to those in the previously described embodiments are designated by the same reference characters used in the previous embodiments.

Figure 20:
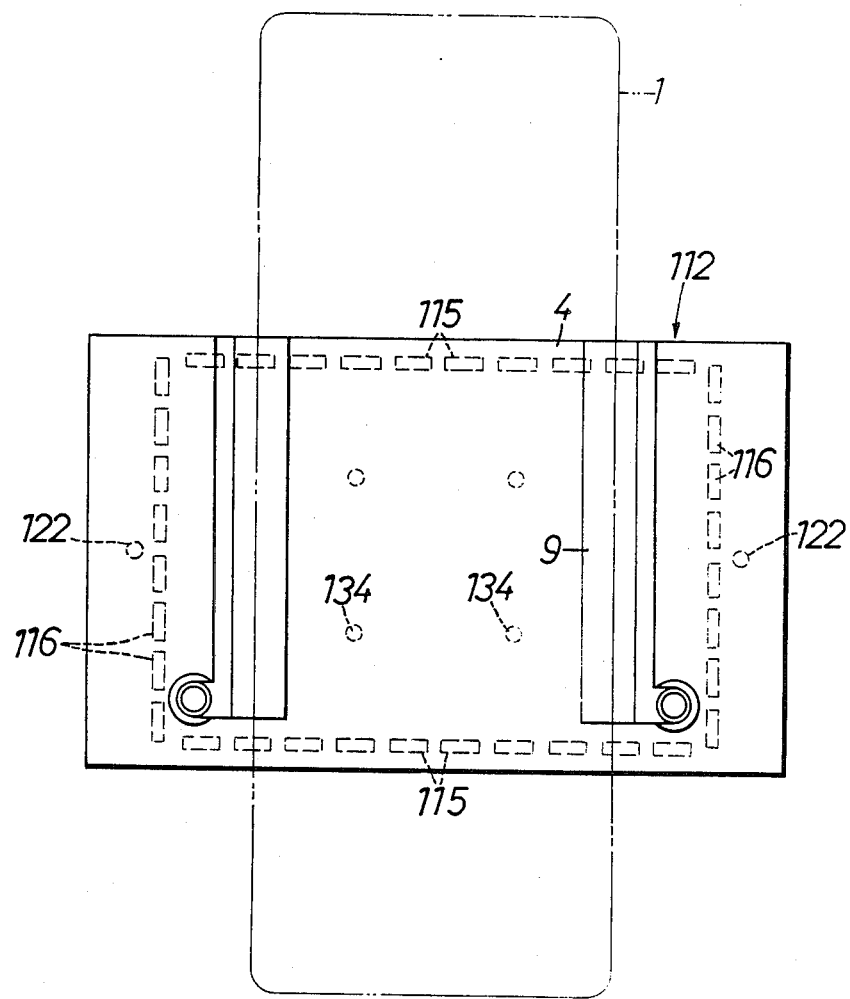

Referring first to FIGS. 18, 19 and 20, a travel carriage 112 includes a rectangular base 4. Pinned on the base 4 are two arrays of a plurality of first wheels 115 arranged in the lengthwise direction of the base 4, and two arrays of a plurality of second wheels 116 arranged in the direction perpendicular to the direction of first wheels 115 arranged.

Figure 21:
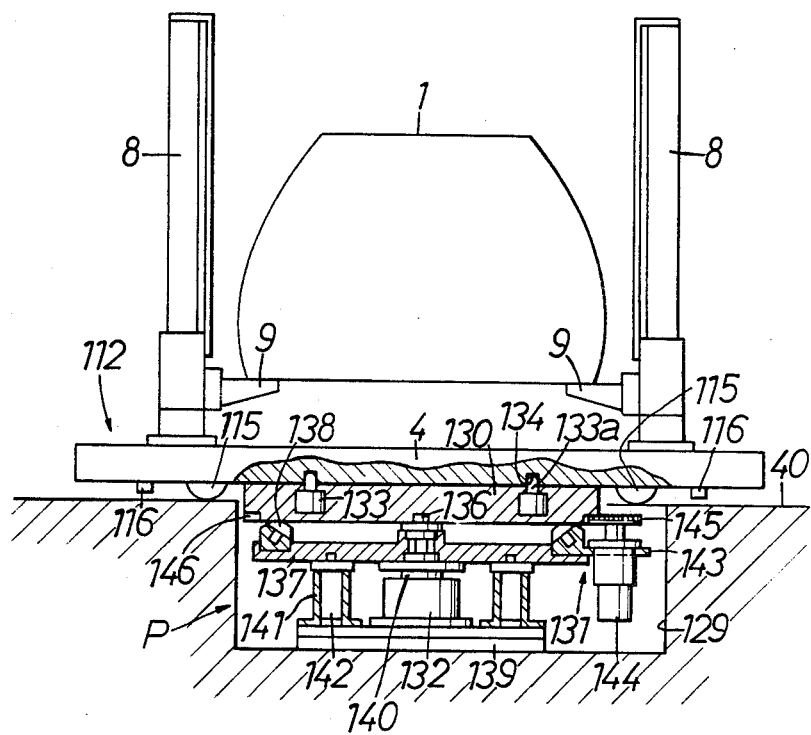

Referring to FIG. 21, the first and second wheels 115 and 116 are arranged in such a manner that when the individual first wheels 115 are landed on a travel path surface 40 serving as a first path surface, the individual second wheels 116 are lifted off the travel path surface 40. This enables the switching between the travelling of the base 4 in the lengthwise direction by the operation of the first wheels 115 and the travelling of the base 4 in the widthwise direction by the operation of the second wheels 116.

Referring again to FIG. 18, a single or a plurality of shifting position or positions P for the travel carriage 112 is or are established on the way of the transfer direction 3, and in the shifting position(s) P, the orientation or direction of the travel carriage 112 and thus the body 1 on the travel carriage 112 is changed by 90 degrees. For example, the travel carriage 112 is travelled with the lengthwise direction thereof aligned with the transfer direction 3 to the shifting position P where it is angularly displaced through 90 degrees, and then, the carriage 112 restarts to travel in an attitude with the lengthwise direction perpendicular to the transfer direction 3.

A pair of first driving chains 118 are disposed in the transfer direction 3 to provide the travelling of the travel carriage 112 to the shifting position P. These first driving chains 118 each are an endless chain and are arranged in parallel to each other. Clamping projections 119 and 120 are mounted on the first driving chains 118 at a distance spaced away from each other as shown in FIG. 22 to abut against the lengthwise opposite ends of the base 4 on the travel carriage 112 to clamp the carriage 112 during driving thereof. Additionally, guide grooves 121 are provided in parallel in the travel path surface 40 between both of the first driving chains 118, and a pair of pins 122 are mounted on the underside at the lengthwise opposite ends of the base 4 and protruded in the guide grooves 121.

A pair of second driving chains 123 as moving members are also arranged in parallel in the transfer direction 3 to extend from the shifting position P. A pair of guide rails 124 are laid on the travel path surface 40 in parallel to the second driving chains 123. The guide rails are formed on their upper surfaces with second path surfaces 124a and serve to guide the second wheels 116 thereon when the travel carriage 112 is in an attitude with the lengthwise direction perpendicular to the transfer direction 3. When the second wheels are riding on the rails 124, the first wheels 115 are lifted off the travel path surface 40, as shown in FIG. 23.

Referring to FIGS. 24 and 25, a fitting member 28 is fixedly mounted on the second driving chain 123 and has a bore 127 as a recess into which is fitted the pin 122 on the travel carriage 112. Further, a stopper 125 is mounted on the second driving chain 123 at a place rearwardly apart from the bore 127 in the transfer direction 3 and adapted to abut against the rear end, with respect to the transfer direction 3, of the base 4 on the travel carriage 112.

Referring again to FIG. 21, a pit 129 is provided in the travel path surface 40 at the shifting position P. Within the pit 129, there is liftably disposed a turn table 130 for angularly displacing the travel carriage 112 placed thereon through 90 degrees, and there are also contained turn drive means 131 for driving the turn table 130 for angular displacement and a lifting cylinder 132 as table lifting drive means for providing the upward and downward movements of the turn table 130.

The turn table 130 is formed into a disk-shaped configuration and has a plurality of, for example, four positioning cylinders 133 arranged on the upper surface thereof at uniform distances spaced around the vertical axis thereof. Each of the positioning cylinders 133 is operable to expand and retract between a state in which its piston rod 133a is protruded upwardly from the upper surface of the turn table 130 and a state in which the piston rod 133a is retreated below that upper surface. Four fitting recesses 134, into which the piston rods 133a of the positioning cylinders 133 may be fitted, are provided in the undersurface of the base 4 on the travel carriage 112.

In addition, a guide groove 135 is provided in the upper surface of the turn table 130 and connected to the guide grooves 121 in the travel path surface 40.

A shaft 136 mounted to project vertically downwardly from the central undersurface of the turn table 130 is rotatably supported by a disk-shaped support plate 137. Further, a plurality of rollers 138 are arranged between the lower surface of the turn table 130 and the upper surface of the support plate 137.

A lifting cylinder 132 having a vertical axis is fixedly mounted on a bottom plate 139 securely mounted on the bottom of the pit 129 and has a piston rod 140 whose fore or upper end abuts against the central lower surface of the support plate 137. A plurality of guide tubes 141 are raised on the bottom plate 139 to surround the lifting cylinder 132, and guide rods 142 mounted to project downwardly from the undersurface of the support plate 137 are slidably fitted in the guide tubes 141, respectively. Thus, the expansion and retraction of the lifting cylinder causes the support plate 137 and thus the turn table 130 to be moved up and down.

The turn drive means 131 is comprised of a motor 144 having a vertical axis and supported and fixed on a bracket 143 mounted to project sideways from the support plate 137, a drive gear 145 fixedly mounted on the fore end of an output shaft of the motor 144, and a driven gear 146 provided on the entire outer peripheral surface of the turn table 130 to mate with the drive gear 145. The turn drive means 131 enables the turn table 130 to be turned through 90 degrees by actuating the motor 144 only for a given period of time.

A pair of cylindrical guide posts 8 are mounted to rise on the base 4 of the travel carriage 112 to a distance larger than the width of the body 1, as in the previous first and second embodiments, and receiver members 9 are disposed for upward and downward movement along the respective posts 8 for receiving the left and right opposite side bottom portions of the body 1. A lift drive source is carried on the travel carriage 112 for driving the receiver members 9 for upward and downward movement.

The following is the description of the operation of the fourth embodiment. The body 1 is placed onto the both receiver members 9 of the travel carriage 112. In this state, the carriage 112 travels toward the shifting position P in the attitude with the lengthwise direction of the body 1 being perpendicular to the transfer direction 3. More specifically, the travel carriage 112 clamped between both of the clamping projections 119 and 120 with the running of the first drive chains 118 moves toward the shifting position P while permitting the first wheels 115 to be rolled on the travel path surface 40. In this case, the pins 122 are guided in the guide grooves 121 and hence, the proceeding direction of the travel carriage 112 cannot be deviated.

When the travel carriage 112 has reached the shifting position P, the positioning cylinders 133 are expanded, so that the fore ends of the piston rods 133a are fitted into the positioning recesses 134 to ensure the positioning of the travel carriage 112 on the turn table 130.

Then, the expanding operation of the lifting cylinder 132 causes the turn table 130 to be moved up, whereby the pins 122 come out of the guide grooves 121, while at the same time, the first wheels 115 are lifted off the travel path surface 40.

Thereupon, the turn table 130 is angularly displaced through 90 degrees by the turn drive means 131 and is moved down. This causes each second wheel 116 to ride on the second path surface 124a of the guide rail 124 and also causes the pins 122 to be fitted into the bore 127 in the fitting members 128.

At the time when the second wheels 116 being on the guide rails 124 with the pins 122 fitted into the bores 127 has been detected, the second drive chains 123 are started to travel, whereby the travel carriage 112 starts to travel forwardly in the transfer direction 3 in the attitude with the lengthwise direction of the body 1 aligned with the transfer direction 3.

The body 1 can be moved with the direction or orientation thereof varied through 90 degrees in this manner, and can be also moved up and down. Therefore, the orientation and level of the body 1 can be selected depending on the type of parts to be assembled to the body 1, leading to an improvement in assembling efficiency.

The first and second wheels 115 and 116 have been arranged rectangularly on the travel carriage 112 in the fourth embodiment, but they may be arranged squarely. In this case, however, the first and second path surfaces should assume the same location in the shifting position P, because the distance between the arrays of the first wheels 115 arranged in the two lines is equal to that between the arrays of the second wheels 116 arranged in the two lines. In a fifth embodiment, an auxiliary rail 147 may be liftably disposed in the pit 129 at the shifting position P to extend in the direction of guide rails 124 laid, so that it may be moved up and down between a position level with the travel path surface 40 and a position level with the guide rails 124. More specifically, a lifting cylinder 148 is disposed on the bottom of the pit 129 to have a vertical axis, and the auxiliary rail 147 is horizontally connected to the upper end of a piston rod 148a in the lifting cylinder 148.

Even with such arrangement, the travel carriage 112 can be shifted in orientation or direction through 90 degrees in the shifting position P.

FIGS. 27 to 30 illustrate a sixth embodiment of the present invention, wherein the portions corresponding to those in the previous embodiments are designated by the same reference characters used in the previous embodiments.

A pair of first transfer systems 158 are disposed to permit the travelling of the travel carriage 112 to the shifting position P, and a pair of second transfer systems 159 are disposed to permit the travelling of the travel carriage 112 in the transfer direction 3 after shifting in direction. Both of the transfer systems 158 and 159 are basically of the same construction and hence, only the arrangement of the first transfer systems 158 will be described in detail hereinbelow.

Referring to FIGS. 29 and 30, the first transfer systems 158 are mounted on the travel path surface 40 in a parallel pair in the transfer direction 3. More particularly, two parallel grooves 160 are provided in the travel path surface 40, and the first transfer systems 158 are disposed in the grooves 160.

The first transfer system 158 includes a moving member 163 reciprocally movable within the groove 160 and extending a long distance. The moving member 163 is provided, on each of its opposite upper and lower surfaces, with a pair of racks 161, 162. The first transfer system 158 further includes pairs of pinions 164 and 165 disposed to mate with the corresponding racks 161 and 162 in a plurality of positions along the transfer direction 3, and a clamp mechanism 166 disposed on the moving member 163 to connect the moving member 163 with the travel carriage 112.

The racks 161 and 162 are cut in the opposite side portions on the upper and lower opposite surfaces of the moving member 163 in the transfer direction 3, respectively. A pair of brackets 167 are fixedly disposed in each of a plurality of places spaced at distances in the transfer direction 3, and the upper and lower pairs of pinions 164 and 165 meshed with the racks 161 and 162 of the moving member 163 are pinned on the brackets 167, respectively. A pair of upper and lower pinions 164a and 165a are pinned on the bracket 167a fixedly mounted at a specific place along the transfer direction 3 to mate with the racks 161 and 162, and a drive motor 168 as a drive source is connected to the lower one 165a of these pinions. The motor 168 is reversibly rotatable, so that the actuation of the motor 168 causes the moving member 163 is reciprocately move in the transfer direction 3.

The clamp mechanism 166 releasably clamps the pin 169 protruded downwardly from the travel carriage 112, and comprises a drive member 170 relatively movable on the moving member 163 in the lengthwise direction, a cylinder 172 supported and fixed on the moving member 163 and having a piston rod 171 connected to one end of the drive member 170, and pairs of opposed support plates 173 fixedly mounted on the moving member 163 at places spaced in the longitudinal direction. The clamp mechanism 166 further includes a pair of shafts 174 and 175 supported by the support plates 173 to have a horizontal axis perpendicular to the transfer direction 3, a first grasp piece 176 secured at its middle portion to one of the shafts 174 and connected at one end to the drive member 170, a second grasp piece 177 secured at one end to the other shaft 175, and intermeshing gears 178 and 179 securely mounted on the shafts 174 and 175.

Notches 180 and 181 designed to define a hole into which the pin 169 is fitted in cooperation are provided in an opposed relation at the other ends of the grasp pieces 176 and 177 to grasp the pin 169 in cooperation. The grasp pieces 176 and 177 grasp the pin 169 with the other ends thereof abutting against each other, and by moving the drive member 170 by the cylinder 172, the pieces 176 and 177 swing so that the other ends thereof move toward or away from each other.

Four pins 169 are protruded downwardly from the lower surface of the base 4 of the travel carriage 112 on a phantom circle drawn around the center of that lower surface. The two pins 169 are disposed at places to correspond to the two first transfer systems 158, and the remaining two pins 169 are disposed at places to correspond to the two second transfer systems 159.

Like the first transfer systems 158, the second transfer systems 159 are also disposed in parallel along the transfer direction 3, so that the two pins 169 of the travel carriage 112 shifted through 90 degrees at the shifting position P correspond to the places of the both second transfer systems 159.

As shown in FIG. 27, a pair of guide rails 183 are laid on the travel path surface 40 in parallel to the second transfer systems 159, so that the second wheels 116 may ride on the guide rails 183. When the second wheels 116 have been placed on the guide rails 183, the first wheels 115 are lifted off the travel path surface 40. Therefore, the individual pins 169 are also raised above the level at which they lie when the first wheels 115 are on the travel path surface 40 and hence, each of the grasp pieces 176 and 177 of the second transfer systems 159 is formed to have a sufficient length to grasp the pin 169.

The following is the description of the operation of the sixth embodiment. The body 1 is placed onto the both receiver members 9 of the travel carriage 112. In this state, the carriage 112 travels to the shifting position P in the attitude with the longitudinal direction of the body 1 being perpendicular to the transfer direction 3. More specifically, each pin 169 is clamped between both the grasp pieces 176 and 177 by retracting the cylinder 172 in the clamp mechanism 166 of each the first transfer systems 158, and the carriage 112 is moved to the shifting position P by actuating the drive motor 168 to move the moving member 163 in the lengthwise direction.

At the shifting position P, the travel carriage 112 is positioned on the turn table 130. In this state, the cylinder 172 is expanded to swing both the grasp pieces 176 and 177 to open, thus releasing the clamped state of the pin 169 by clamp mechanism 166.

Then, the turn table 130 is moved up, and the first wheels 115 are lifted off the travel path surface 40.

Thereupon, the turn table 130 is angularly displaced through 90 degrees and then lowered. This causes the individual second wheels 116 to be put on the guide rails 183 and in this state, the individual first wheels 115 are lifted off the travel path surface 40.

With the individual second wheels 116 put on the guide rails 183, each pin 169 is clamped by the clamp mechanism 166 of the second transfer system 159, and the moving member 163 is moved in the transfer direction 3. Thus, the carriage 112 starts to travel forwardly in the transfer direction 3 in the attitude with the longitudinal direction of the body 1 being aligned with the transfer direction 3.

In this manner, the body 1 can be displaced for the change of its direction or orientation through 90 degrees and also raised and lowered. Therefore, the direction or orientation of the body 1 can be selected depending on the type of parts to be assembled thereto, leading to an improvement in assembling efficiency.

In the above sixth embodiment, the travel carriage 112 has been driven by the separate first and second transfer systems 158 and 159 in the sections upstream and downstream of the shifting position P. Alternatively, a shifting position may be established on the way of transfer systems arranged in two lines, so that when the clamped state of the pin 169 by the clamp mechanism 166 has been released, the direction of the travel carriage 112 can be changed. In addition, at least one pin 169 may be mounted in projection on the travel carriage 112. Further, the racks 161 and 162 need not be provided over the entire length of the moving member 163 and may be partially mounted by a distance required for the movement of the moving member 163. In this case, the movement of the moving member 163 may be guided in the section free of the racks 161 and 162 by a roller.

FIGS. 31 to 33 illustrate a seventh embodiment of the present invention, wherein the same reference characters as in the previously described embodiments are used to designate the portions corresponding to those in the previous embodiments. Referring first to FIG. 31, for example, a rectangular endless travel line L is established for an automatic assembling process, wherein the assembling of an automobile is carried out while the travel carriage 112 travels along the travel line L. The travel carriage 112 is shifted through 90 degree at four curved sections C1, C2, C3 and C4 of the travel line L.

The travel line L is constituted into a rectangular form by a pair of first guide rails G1 laid in parallel to each other on the floor surface 187 to form a first path surface 185 on which the first wheels 115 roll, a pair of second guide rails G2 laid on the floor surface in parallel to each other and perpendicularly to the first guide rails G1 to form a second path surface 186 on which the second wheels 116 roll, a pair of third guide rails G3 laid on the floor surface 187 in parallel to the first guide rails G1 to form a first path surface 185 on which the first wheels 115 roll, and a pair of fourth guide rails G4 laid on the floor surface 187 in parallel to the second guide rails G2 to form a second path surface 186 on which the second wheel 116 roll.

Referring to FIG. 32, the first and third guide rails G1 and G3 are buried in the floor surface 187 with the first path surfaces 185 provided by their upper surfaces being flush with the floor surface 187. On the other hand, the second and fourth guide rails G2 and G4 are laid on the floor surface 187 with the second path surfaces 186 provided by their upper surfaces being above the floor surface 187. That is, the second path surfaces 186 are above the first path surfaces 185. The first and second wheels 115 and 116 of the travel carriage 112 are attached in such a manner that when the first wheels 115 are landed on the first path surfaces 185, the second wheels 116 are lifted off the first path surfaces 185, i.e., the floor surface 187, and when the second wheels 116 are landed on the second path surfaces 186, the first wheels 115 are lifted off the first path surfaces 185, i.e., the floor surface 187. This enables the switching between the travelling of the travel carriage 112 in the lengthwise direction by the operation of the first wheels 115 and the travelling of the travel carriage 112 in the widthwise direction by the operation of the second wheels 116.

In the individual curved sections C1 to C4 in the travel line L, a pair of switch rails 189 are liftably disposed on the extensions of each of the second and fourth guide rails G2 and G4 to form switch path surfaces 188 on their upper surfaces. A pit 190 is provided in each of the curved sections C1 to C4 to correspond to each of the switch rails 189, and a pair of lifting cylinder 191 are fixedly disposed on the bottom of the pit 190. Each of the lifting cylinders 191 has a piston rod 192 which is protruded upwardly and whose fore or upper end is connected to the switch rail 189. Thus, the expansion and retraction of the lifting cylinder 191 enables the switch rail 189 to be moved up and down between an upper limit position in which the switch path surface provided by its upper surface is flush with the second path surface 186 and a lower limit position in which the switch surface is either flush with or below the first path surface 185, i.e., the floor surface 187.

Therefore, when the carriage 112 has travelled on the first guide rails G1 or the third guide rails G3 with the switch path surfaces 188 left in the lower limit positions and has reached a given position in the curved section C1 or C3, the lifting of the corresponding switch path surface 188 to the upper limit position enables the carriage 112 to be travelled from the switch path surface 188 to the second guide rails G2 or the fourth guide rails G4. In addition, When the travel carriage 112 has travelled on the second guide rails G2 or the fourth guide rails G4 with the switch path surfaces left in the upper limit positions and has reached a given position in the curved section C2 or C4, the lowering of the corresponding switch path surface 188 to the lower limit position enables the first wheels 115 to be landed onto the first path surface 185 so that the carriage 112 can be travelled on the first guide rails G1 or the third guide rails G3.

A pair of travel drive means 193 are disposed between every two of the curved sections C1 to C4 in the travel line L. These travel drive means 193 are freely switchable between the connection to and the disconnection from the base 4 of the travel carriage 112. The actuation of the travel drive means 193 in the connected state causes the carriage 112 to travel in the travel direction 3.

Moreover, each of the travel drive means 193 is connectable to the base 4 which has been moved a slight distance in the travel direction 3 from one of the curved sections C1 to C4, and is also disconnectable from the base 4 with the front portion of the base 4 in the travel direction 3 having entered any one of the curved sections C1 to C4. In the curved sections C1 to C4, there are disposed pushing-in cylinders 195a, 195b, 195c and 195d for urging the travel carriage disconnected from the travel drive means 193 to move it to the given position, and there are also disposed pushing-out cylinders 196a, 196b, 196c and 196d for urging the travel carriage 112 in the given position to move it to a position in which the carriage 112 can be connected to the travel drive means 193.

Each of the travel drive means 193 is, for example, an endless chain driven by a drive source (not shown), so that the switching between the connecting and disconnection of the the chain to and from the base 4 causes the travel carriage 112 to travel and stop. Alternatively, a rack extending in the travel direction 3 may be reciprocately driven within a given extent, so that the carriage 112 may be travelled by every given pitch through the switching between the connection and disconnection of the travel carriage 112 to and from the rack.

Referring to FIG. 33, each of the pushing-in cylinders 195a to 195d is fixedly disposed to have an axis extending in the travel direction 3, and a locking claw 198 is supported at the fore end of a piston rod 197 in each of the pushing-in cylinders through a pivot 199 perpendicular to the travel direction 3 in such a manner that it swings downwardly when subjected to a force acting thereon forwardly in the travel direction 3, but it is prevented from swinging when subjected to a force acting thereon backwardly in the travel direction 3. The locking claw 198 is biased to swing upwardly by a spring (not shown). Thus, the carriage 112 can be passed over the individual pushingin cylinders 195a to 195d, and when the travel carriage 112 has been stopped, the expansion of the corresponding one of the pushing-in cylinders 195a to 195d causes the locking claw 198 to engage the base of the carriage 112, whereby the travel carriage 112 is urged by such pushing-in cylinder.

A stopper 200 is also fixed in each of the curved sections C1 to C4 for stopping, at the given position, the carriage 112 moved by each of the pushing-in cylinders 195a to 195d.

Each of the pushing-out cylinders 196a to 196d is also constructed in the same manner as the pushing-in cylinders 195a to 195d, and is disposed to urge the travel carriage 112 in the given position in any one of the curved sections C1 to C4 to move it in the travel direction 3.

A guide groove 201 extending in the travel direction 3 is provided in the floor surface 187 at each of the centers between the first guide rails G1 and between the third guide rails G3, and a groove 202 is also provided in each of the switch rails 189 and connected to the guide groove 201. Guide grooves 203 extending in the travel direction 3 are provided in the floor surface 187 oppositely outside each ones of the second guide rails G2 and the fourth guide rails G4 and perpendicularly connected to the individual guide grooves 201.

Meanwhile, a pair of pins 204 are mounted in downward projection on the lower surface of the base 4 of the travel carriage 112 at the lengthwise central places spaced in the lengthwise direction, and they may be movably engaged in the guide grooves 201 and 203. This ensures that the travel carriage 112 travels without going out of the travel line L.

Description will be made of the operation of the seventh embodiment. The body 1 is placed onto the both receiver members 9 of the travel carriage 112. When the carriage 112 travels on the first guide rails G1 in this state, the base 4 is in the attitude with the lengthwise direction thereof turned to the travel direction 3 and hence, the body 1 is moved with the widthwise direction thereof turned to the travel direction 3.

When a portion of the travel carriage 112 has reached the curved section C1, the movement of the travel carriage 112 by the travel drive means 193 is stopped, and the pushing-in cylinder 195a causes the travel carriage 112 to move until it abuts against the stopper 200. In this case, the switch rails 189 have been lowered and hence, the second wheels 116 cannot hit against the switch rails 189.

When the travel carriage 112 is stopped in the given position, the switch rails 189 are raised to abut against the second wheels 116 to lift them. When the switch rails 189 reach the upper limit positions, the switch path surface 188 is level with the second path surface 186, and the first wheels 115 are lifted off the first path surface 185. In this state, the pushing-out cylinder 196a is operated to expand, thereby allowing the travel carriage 112 to proceed in the travel direction 3, with the second wheels 116 rolling from the switch path surface 188 onto the second path surface 186.

Then, the travel carriage 112 is driven to travel by the travel drive means 193 and is guided on the second guide rails G2 to move toward the curved section C2. In this case, the base 4 of the travel carriage 112 is in the attitude with the widthwise direction turned to the travel direction 3, and the body 1 is moved with the longitudinal direction thereof turned to the travel direction 3.

When a portion of the travel carriage 112 has reached the curved section C2, the travelling thereof by the travel drive means 193 is stopped, and the pushing-in cylinder 195b allows the carriage 112 to be moved to the given position in the curved section C2. In this case, the switch rails 189 are in the upper limit positions, and the second path surface 186 of the second guide rails G2 is level with the switch path surface 188 of the switch rails 189 and therefore, the travel carriage 112 can be smoothly moved to the given position.

Then, the switch rails 189 are lowered, whereby the first wheels 115 of the travel carriage 112 are landed onto the first path surface 185, while the second wheels are lifted off the switch path surface 188 and the floor surface 187.

Thereupon, the pushing-out cylinder 196b is operated to expand, whereby the travel carriage 112 is moved on the third guide rails G3 to the position in which it can be driven by the travel drive means 193.

In this way, the travel carriage 112 travels along the travel line L with the shifting through 90 degrees in each of the curved sections C1 to C4, and it follows that the body 1 placed on the travel carriage 112 is also moved with the similar shifting through 90 degrees.

Accordingly, the assembling of the parts to the body 1 is facilitated and the automation of part assembling is also facilitated. In addition, the travel carriage 112 returns to the original position after travelling round the travel line L, the operator's trouble of moving the empty carriage 112 to a starting position can be saved. Further, because the travel line is endless, the assembling of an automobile can be carried out in a relatively compact space, leading to an improvement in mass circulation and in maintenance of equipment.

The travel carriage 112 has been driven to travel by the travel drive means 193 in the above embodiments, but it should be understood that the carriage 112 may be designed to be self-travelable.

What is claimed is:

1. An apparatus for transferring a vehicle body to assemble an automobile comprising a travel carriage which is travelable along a travel path with a vehicle body carried thereon and is capable of changing an angular orientation thereof about a vertical axis, said travel carriage comprising a base, travel wheels disposed steerably on said base, a steering mechanism mounted on said base for steering said travel wheels, a travel drive source connected to said travel wheels, a pair of guide posts fixedly mounted on said base at a distance from each other larger than the width of the vehicle body, a pair of receivers mounted for upward and downward movement along the corresponding guide posts to receive left and right opposite side bottom portions of the vehicle body, and a lift mechanism connected to the receiver members; and a lift drive source disposed at a predetermined position along said travel path and connectable to said lift mechanism.

2. An apparatus for transferring a vehicle body to assemble an automobile comprising a travel carriage which is traveable along a travel path with a vehicle body carried thereon and is capable of changing an angular orientation thereof about a vertical axis, said travel carriage comprising a base, travel wheels disposed steerably on said base, a steering mechanism mounted on said base for steering said travel wheels, a travel drive source connected to said travel wheels, a single guide post fixedly mounted on said base, a lifter liftable along said guide post, and a receiver member for receiving the left and right opposite side bottom portions of the vehicle body fixedly mounted on the upper end of said lifter; and a lift drive source disposed at a predetermined position along said travel path and connectable to said lifter.

3. An apparatus for transferring a vehicle body to assemble an automobile according to claim 1 or 2, wherein a plurality of drive wheels are arranged in arrays extending parallel to each other at a predetermined section on the way of said travel path and driven for rotation about a horizontal axis, and said base is provided with slide contact plates which are vertically movably disposed thereon and are adapted to come into slide contact with the drive wheels, and drive means is provided for vertically driving said slide contact plates between an upper limit position in which the slide contact plates are located above the drive wheels with the travel wheels being landed on the travel path and a lower limit position in which the slide contact plates are brought into slide contact with the drive wheels with the travel wheels being lifted off the travel path.

4. An apparatus for transferring a vehicle body to assemble an automobile according to claim 1, wherein a pit is provided in a floor surface on the way of the direction of transfer by the travel carriage, and a turn table is liftably disposed in said pit, said turn table being adapted to carry said travel carriage thereon and having table lift drive means connected thereto and rotation drive means connected thereto for driving the turn table for angular displacement about a vertical axis.

5. An apparatus for transferring a vehicle body to assemble an automobile according to claim 4, wherein said travel carraige is provided with a plurality of first travel wheels disposed in parallel arrays and rollable on a first surface of the travel path, and a plurality of second travel wheels disposed in parallel arrays extending perpendicularly to the parallel arrays of the first travel wheels and rollable on a second surface of the travel path located higher than the first surface, the first and second travel wheels being mounted on the travel carriage so that when the first travel wheels are landed on the first surface, the second travel wheels are lifted off the first surface, and when the second travel wheels are landed on the second surface, the first travel wheels are lifted off the first surface.

6. An apparatus for transferring a vehicle body to assemble an automobile according to claim 4 or 5, wherein a pin is mounted on the travel carriage to project therefrom, and a recess is provided in a moving member travelable along the transfer direction of the travel carriage, said recess being adapted to receive the pin fitted thereinto and further, a stopper is mounted in projection on the moving member at a position behind said recess with respect to the transfer direction and is adapted to abut against the rear portion of the travel carriage with respect to the transfer direction.

7. An apparatus for transferring a vehicle body to assemble an automobile according to claim 4 or 5, wherein a pin is mounted on the travel carriage to project therefrom, and a clamp mechanism for releasably clamping said pin is mounted on a moving member extending in the transfer direction and having a rack partially provided on the side thereof, and a drive source is connected to a pinion meshed with said rack.

8. An apparatus for transferring a vehicle body to assemble an automobile according to claim 7, wherein said drive source is a reversibly rotatable drive motor.

9. An apparatus according to claim 1, wherein the travel path is arranged in an endless manner into a configuration comprising a combination of a plurality of first travel surfaces extending in parallel to each other in one direction and a plurality of second travel surfaces extending in parallel to each other in a direction perpendicular to extending direction of the first travel surfaces and lying at a level higher than that of the first travel surfaces; wherein a plurality of first travel wheels rollable on a first travel surface and a plurality of second travel wheels rollable on a second travel surface are mounted on the travel carriage on which a vehicle body is placed, the positions of first and second travel wheels on the travel carriage being such that when the first travel wheels are landed on the first travel surface, the second travel wheels are lifted off the first surface, and when the second travel wheels are landed on the second travel surface, the first travel wheels are lifted off the first travel surface; and wherein switch travel surfaces continuous to the second travel surfaces are liftably disposed at respective angled corner sections of said travel path.

10. An apparatus for transferring a vehicle body to assemble an automobile, comprising a travel carriage which is capable of traveling along a travel path with a vehicle body carried thereon and capable of changing an angular orientation thereof around a vertical axis, said travel carriage including a base, travel wheels disposed steerably on said base, a steering mechanism on the base for steering on said travel wheels, a travel drive source connected to the travel wheels, a guide post fixedly mounted to the base, a receiver member vertically movable along said guide post and adapted to receive said vehicle body thereon, and a lift mechanism connected to the receiver member and having a drive power input connecting portion; and a lift drive source fixed at a predetermined position on the way of said travel path and having drive power output connecting portion which is capable of being connected with and released from a connection thereof with said drive power input connecting portion of the lift mechanism.

11. An apparatus according to claim 10, wherein said guide post is mounted in a pair so as to stand on said base at a distance therebetween larger than the width of the vehicle body, and said receiver member is mounted in a pair for the respective guide posts so as to receive left and right opposite side bottom portions of the vehicle body, respectively.

12. An apparatus according to claim 10, wherein said receiver member is fixedly mounted to an upper end of a lifter which is vertically movable along said guide post, said receiver member receiving left and right opposite side bottom portions of the vehicle body.

13. An apparatus according to claim 10, 11 or 12, wherein a plurality of drive wheels are arranged in arrays extending parallel to each other at a predetermined section on the way of the travel path, said drive wheels being driven to rotate about a horizontal axis, and said base is provided with slide contact plates which are vertically movably disposed thereon and are adapted to come into slide contact with the drive wheels, and drive means is provided for vertically driving said slide contact plates between an upper limit position in which the plates are located above the drive wheels with the travel wheels being landed on the travel path and a lower limit position in which the plates are placed in slide contact with the drive wheels with the travel wheels being lifted off the travel path.

14. An apparatus according to claim 10 or 11, wherein a pit is provided in a floor at an intermediate position of the travel path, and a turn table is liftably disposed in said pit, said turn table being adapted to carry said travel carriage thereon and being connected with table lift drive means and rotation drive means for driving the turn table so as to be angularly displaced about a vertical axis.

15. An apparatus according to claim 14, wherein said travel carriage is provided with a plurality of first travel wheels which are disposed in parallel arrays and are rollable on a first surface of the travel path, said travel carriage being further provided with a plurality of second travel wheels which are disposed in parallel arrays extending perpendicularly to the arrays of the first travel wheels and are rollable on a second surface of the travel path located higher than the first surface, said first and second travel wheels being mounted on such positions of the travel carriage that when the first travel wheels are landed on the first surface, the second travel wheels are lifted off the first surface whereas when the second travel wheels are landed on the second surface, the first travel wheels are lifted off the first surface.

16. An apparatus according to claim 14, wherein a pin is projected on the travel carriage, and a recess is provided in a moving member which is travelling along the transfer direction of the travel carriage, said recess being adapted to receive the pin thereinto, and further, a stopper is projected on the moving member at a position behind said recess with respect to the transfer direction, said stopper being adapted to abut against a rear portion of the travel carriage with respect to the transfer direction.

17. An apparatus according to claim 14, wherein a pin is projected on the travel carriage, a clamp mechanism for releasably clamping said pin is mounted on a moving member which extends in the transfer direction so as to have a rack provided on a part of a side portion thereof, and a drive source is connected to a pinion meshed with said rack.

18. An apparatus according to claim 17, wherein said drive source is a reversibly rotatable drive motor.

19. An apparatus according to claim 10 or 11, wherein the travel path is arranged in an endless manner into a configuration comprising a combination of a plurality of first travel surfaces extending parallel to each other in one direction and a plurality of second travel surfaces extending parallel to each other and in a direction perpendicular to the extending direction of the first travel surfaces, the second travel surfaces lying at a level higher than that of the first travel surfaces, wherein a plurality of first travel wheels rollable on the first travel surfaces and a plurality of second travel wheels rollable on the second travel surfaces are mounted to such positions of the travel carriage that when the first travel wheels are landed on the first travel surfaces, the second travel wheels are lifted off the first travel surface, and when the second travel wheels are landed on the second travel surfaces, the first travel wheels are lifted off the first travel surface, and wherein switch travel surfaces continuous to the second travel surfaces are liftably disposed at respective angled corner sections of said travel path.

* * * * *